(12) United States Patent
Saussele et al.

(10) Patent No.: US 9,937,810 B2
(45) Date of Patent: Apr. 10, 2018

(54) CHARGING AND DISCHARGING OF DC MICROGRID ENERGY STORAGE

(71) Applicants: Robert Bosch LLC, Broadview, IL (US); Robert Bosch GmbH, Stuttgart (DE)

(72) Inventors: John Saussele, Davidson, NC (US); Sharmila Ravula, Los Altos, CA (US); Daniel Fregosi, Mooresville, NC (US); Dusan Brhlik, Cornelius, NC (US)

(73) Assignees: Robert Bosch LLC, Broadview, IL (US); Robert Bosch GmbH, Stuttgart (DE)

( * ) Notice: Subject to any disclaimer, the term of this patent is extended or adjusted under 35 U.S.C. 154(b) by 294 days.

(21) Appl. No.: 14/810,803

(22) Filed: Jul. 28, 2015

(65) Prior Publication Data

US 2015/0333512 A1 Nov. 19, 2015

Related U.S. Application Data

(63) Continuation-in-part of application No. 14/421,914, filed as application No. PCT/IB2013/002245 on Aug. 16, 2013.

(Continued)

(51) Int. Cl.
*B60L 11/18* (2006.01)
*H02J 3/14* (2006.01)
*H02J 3/38* (2006.01)
*H02J 9/06* (2006.01)
*H02S 10/20* (2014.01)
(Continued)

(52) U.S. Cl.
CPC ....... *B60L 11/1842* (2013.01); *B60L 11/1809* (2013.01); *G05B 15/02* (2013.01); *G05F 1/10* (2013.01); *H02J 1/00* (2013.01); *H02J 3/14* (2013.01); *H02J 3/38* (2013.01); *H02J 3/381* (2013.01); *H02J 9/065* (2013.01); *H02S 10/20* (2014.12); *H02J 2001/002* (2013.01); *Y02B 10/72* (2013.01); *Y02B 70/3225* (2013.01);
(Continued)

(58) Field of Classification Search
CPC .................................................. B60L 11/1842
USPC .......................................................... 307/43
See application file for complete search history.

(56) References Cited

U.S. PATENT DOCUMENTS 5,633,564 A * 5/1997 Edwards ................. H02J 9/065
307/46
2012/0072040 A1 3/2012 Kaji
(Continued)

FOREIGN PATENT DOCUMENTS

DE 10 2011 009457 A1 7/2012
EP 2 437 374 A2 4/2012
(Continued)

*Primary Examiner* — Joseph Chang
(74) *Attorney, Agent, or Firm* — Maginot Moore & Beck LLP

(57) ABSTRACT

A DC building electrical system includes a DC power consuming device connected to a DC bus. A source of DC power is connected to the DC bus and powers the DC power consuming device. An energy storage device is connected to the DC bus and to a DC emergency load. The energy storage device powers the DC power consuming device in conjunction with the source of DC power, and powers the DC emergency load when source of power other than the energy storage device is available to the DC power consuming device.

17 Claims, 10 Drawing Sheets

Related U.S. Application Data

(60) Provisional application No. 62/115,749, filed on Feb. 13, 2015, provisional application No. 62/115,757, filed on Feb. 13, 2015, provisional application No. 61/684,083, filed on Aug. 16, 2012, provisional application No. 61/699,169, filed on Sep. 10, 2012.

(51) Int. Cl.
  *G05B 15/02* (2006.01)
  *G05F 1/10* (2006.01)
  *H02J 1/00* (2006.01)

(52) U.S. Cl.
  CPC .......... *Y02B 70/3291* (2013.01); *Y04S 20/222* (2013.01); *Y04S 20/248* (2013.01)

(56) References Cited

U.S. PATENT DOCUMENTS

| | | | | |
|---|---|---|---|---|
| 2012/0130556 A1* | 5/2012 | Marhoefer | ................ | H02J 3/32 |
| | | | | 700/291 |
| 2012/0249065 A1* | 10/2012 | Bissonette | ............ | B60L 11/184 |
| | | | | 320/109 |
| 2012/0267952 A1* | 10/2012 | Ballatine | ................ | H02J 1/102 |
| | | | | 307/26 |

FOREIGN PATENT DOCUMENTS

| WO | 2007/018830 A2 | 2/2007 |
|---|---|---|
| WO | 2011/078397 A1 | 6/2011 |

\* cited by examiner

CHARGING AND DISCHARGING OF DC MICROGRID ENERGY STORAGE

CROSS REFERENCES TO RELATED APPLICATIONS/INCORPORATION BY REFERENCE

This application claims priority to U.S. patent application Ser. No. 14/421,914 filed on Feb. 16, 2015, entitled "DC BUILDING SYSTEM WITH ENERGY STORAGE AND CONTROL SYSTEM", to U.S. Provisional Patent Application No. 62/115,749 filed on Feb. 13, 2015, entitled "DIRECT CURRENT BUILDING SCALE MICROGRID WITH ENERGY STORAGE", and to U.S. Provisional Application No. 62/115,757 filed on Feb. 13, 2015, entitled "EMERGENCY LIGHTING SYSTEM FOR A DC MICROGRID". U.S. patent application Ser. No. 14/421,914 claims priority to International Patent Application No. PCT/IB2013/002245 filed on Aug. 16, 2013, entitled "DC BUILDING SYSTEM WITH ENERGY STORAGE AND CONTROL SYSTEM". International Patent Application No. PCT/IB2013/002245 claims priority to U.S. Provisional Patent Application No. 61/684,083 filed on Aug. 16, 2012, entitled "DC MICROGRID BUILDING ENERGY MANAGEMENT PLATFORM", and to U.S. Provisional Patent Application No. 61/699,169 filed on Sep. 10, 2012, entitled "DC MICROGRID BUILDING ENERGY MANAGEMENT PLATFORM". The complete subject matters of these patent applications are hereby incorporated herein by reference, in their entireties.

FIELD

The present invention relates to advanced component technologies which may improve building energy efficiency.

BACKGROUND

Current AC building systems do not use locally-generated renewable energy in the most cost effective way and require a very reliable utility grid connection, resulting in excess life-cycle costs as well as energy security concerns. It is known to utilize batteries as an energy buffer for a PV array, but such systems do not eliminate wasteful AC conversions when addressing the most common building electrical loads, such as lighting and ventilation. Likewise, it is known to provide a smart building energy management system, but such systems do not incorporate a DC microgrid to improve efficiency and energy security. FIG. 1 is a block diagram of one embodiment of a conventional AC reference system for comparison with the present invention.

SUMMARY

The present invention is directed to a DC microgrid without an inverter or a DC-DC optimizer. The DC microgrid powers one or more DC powered devices, which can include lighting and cooling devices. The DC microgrid offers more efficient use of DC power generated by a Photovoltaic (PV) solar array. The DC microgrid is less expensive to implement than conventional PV systems and offers improved payback. The DC microgrid enables use of less expensive DC powered devices. In various embodiments, the DC microgrid can employ the solar synchronized load and/or maximum power point tracking control features described in U.S. patent application Ser. No. 13/560,726 and U.S. Provisional Patent Application No. 61/590,254.

In other embodiments, the PV array of the DC microgrid can be sized to provide an advantageous DC bus voltage range for more efficient Maximum Power Point Tracking (MPPT) control that is lower and/or narrower than conventional DC bus voltage ranges. Alternatively or additionally, the PV array can be sized to provide power within a predetermined range for advantageously balancing power production by the PV array and a utility grid. For example the PV array can be sized to provide less than half the power demand, for example between 25-40% of the power demand.

The Direct Current (DC) Microgrid Building Energy Management Platform (DCMG-BEMP) of the invention offers significant benefits relative to conventional alternating current (AC) building systems in terms of reduced total cost of ownership (TCO) and increased energy security. Conventional building-level power distribution systems suffer from AC-to-DC conversion losses in powering many common devices, as well as DC-to-AC losses when utilizing locally produced DC power, such as from renewable energy sources. For example, these conversions result in up to a 12% greater loss of energy between photovoltaic (PV) arrays and AC lighting loads, when compared to the DC microgrid of the present invention. Typical PV systems also require all power to flow through unreliable and expensive grid-connected inverter hardware, which prevents the PV power from being used for mission-critical activities when the grid power is lost (blackout condition). In addition, current AC building systems have limited or no ability to manage building peak power demands, which can lead to demand charges and further grid instability. The DCMG-BEMP applies a novel approach to using mature, reliable DC technology and dynamically optimizing power sources, loads, and energy storage system interaction, minimizing TCO and reliance on grid-based electricity. Economic modeling using the BLCC tool shows 15%-25% improvement in Savings to Investment Ratio (SIR) over 25 years for the DCMG-BEMP compared to equivalent AC systems. The present invention DCMG-BEMP provides increased energy efficiency, improved energy security, and a lower total cost-of-ownership compared to other approaches.

The invention may provide a DC microgrid configuration in which DC electrical energy is stored in order to power DC loads without being converted to AC electrical energy. Such DC energy storage may be in the form of batteries, capacitors, flywheels, etc., although only batteries are shown in the drawings.

One primary advantage of using energy storage in the DC microgrid configuration is that the energy (e.g., backup power) may be utilized more efficiently by the DC loads when in the form of DC from the energy storage elements. One reason for the higher efficiency is that there are no intermediate conversions from DC storage to AC and back to DC, as is typically done in buildings.

Energy storage elements may be incorporated into the DC power supply, making it effectively similar to an uninterruptable power supply (UPS) configuration. Alternatively, energy storage elements may be connected independently to the DC bus. However, at least one exemplary embodiment in the drawing includes a battery incorporated into a DC power supply, which is connected to an AC grid and is separate from a solar grid (e.g., a renewable DC energy power source.

An energy storage device may be directly connected to the DC bus, or may have intermediate DC/DC converters to optimize voltages and currents for charging/discharging. An energy storage device may be charged from the grid through an AC/DC power supply, may be charged from other DC sources such as solar photovoltaic (PV), or may be charged by both of these methods.

A relatively small amount of energy storage capacity in the DC microgrid may be used to meet the ninety minute emergency lighting requirement for U.S. buildings, without the need for dedicated emergency lighting circuits or distributed battery strategies, as is typical. For example, all the lights may be dimmed, and/or only a subset of the lights may be turned on, via software control, in order to meet the emergency lighting brightness requirement. Using the DC power supply in the uninterruptable power supply (UPS) mode may enable the DC emergency lighting to be powered without adding any additional infrastructure to the building. In the prior art, in contrast, emergency lighting may require additional infrastructure such as separate AC or DC lighting circuits and battery systems. The inventive arrangement may provide advantages such as lower cost, higher reliability, and flexibility to change which lights are turned on during emergencies, and which lighting levels are available during emergencies. These advantages may be realized exclusively via an inventive software configuration.

Larger amounts of energy storage may be included in the DC microgrid to provide varying levels of backup energy. For example, enough backup energy may be stored to keep a building operating throughout the night on most nights in an emergency mode in the event that there is enough excess solar PV energy generated during the day to put into energy storage systems and subsequently be used at night in the DC loads when solar energy is not available. The amount of storage that is required may depend on the amount of power needed in "emergency mode," (i.e., lower lighting or ventilation levels may be acceptable in a blackout), and may depend on the amount of solar energy available in different geographic regions. These variables may be used to statistically calculate the "energy security" or probability of powering the building throughout the night or other desired time period with the excess solar energy stored from the daytime. Any amount of stored solar PV energy can reduce the amount of diesel or other fuel needed for other backup power generation options.

If the DC microgrid incorporates DC thermal loads (e.g., food refrigeration, building HVAC, hot water heating), then the thermal storage may be combined with the electrical energy storage to determine the "energy security". For example, frozen food may stay frozen for some hours even when energy storage is depleted, which may provide enough protection until solar energy is again available in the morning. Further, the food may be frozen to a temperature several degrees below what is required for freezing, and thus the frozen food itself may effectively store energy.

In order to extend the availability of energy storage to keep a building useable in an emergency situation, the electrical loads in the building may be adjusted to adapt to the availability of stored energy, solar power, and the duration of the blackout (e.g., the duration of the loss of utility grid power). For example, in the first hour of a blackout occurring with full sunshine and full energy storage reserves, the lighting, ventilation, or other emergency loads may be kept at full power. However, as the duration of the blackout continues into the second hour with less sunshine available, the emergency loads may be operated at lower power levels in order to conserve stored energy. For example, lights may be dimmed, the ventilation may operate at a lower speed, etc. Additional such adjustments may be made to the operation of the loads as the duration of the blackout becomes longer, and depending on the amount of solar energy available. Through adaptive adjustment of the emergency loads, the building is more likely to remain in a usable state through more blackout scenarios, since short-term blackouts occur more frequently than long-term blackouts, and since weather conditions (e.g., amount of sun) may be very different during different blackouts.

Energy storage which is primarily designed into the DC microgrid for use as backup may also be used for "demand response" purposes to help the utility company manage peak power demands. For example, the utility company may send an electrical signal or provide an incentive (e.g., time-of-day utility rates or demand charges) for the DC microgrid to use power from the energy storage and PV for DC loads rather than from the utility grid for a period of time, thus reducing the electricity demand on the utility grid during a peak period ("DC load-leveling").

Further to the above, the energy storage may be connected to a DC/AC inverter or bi-directional AC/DC converter which would allow the energy storage to also be used to offset peak demands from AC loads in the building or elsewhere on the AC utility grid ("AC load leveling"). The DC microgrid may be configured to provide a combination of the above—DC load leveling and AC load leveling.

Energy storage in the DC microgrid may have the unique ability to be periodically tested by feeding some or all of the power for the DC loads from the DC energy storage for test purposes without affecting building functionality. For example, the lights may not blink during such testing. In other words, some or all power may be directed to flow from the DC energy storage to the DC loads during the test period, temporarily reducing or eliminating the power needed from the DC power supply, PV, or other energy source. During this test period, voltages and/or currents may be measured to validate the rate of discharge and determine the health of the storage system. Similarly, solar PV or another DC power source may be used to charge energy storage and determine health of the energy storage system from the charge rate.

Building energy storage elements in the DC microgrid also may be used as an energy supply for commercial electric vehicles used in and around a building or complex. For example, the batteries from electric fork-lifts may be used as part of the building energy storage while they are being charged on or off the vehicle, and the batteries from electric golf carts may be used as building energy storage, etc. The above concept may be used in a conventional AC connection to the building via a single or bi-directional AC/DC inverter.

Industrial fans or other DC motor loads may be used in the DC microgrid as virtual flywheel storage via use of a bi-directional variable frequency drive (VFD) on the motor connected to the DC bus. This concept may also be known as regenerative braking, or generating power from the slowing down of a motor. An advantage of this arrangement is that some short-term storage is realized through the use of existing motor devices, potentially saving cost through reduction or elimination of additional storage elements in the system.

In one embodiment, the invention comprises a DC building electrical system including a DC power consuming device connected to a DC bus. A source of DC power is connected to the DC bus and powers the DC power consuming device. An energy storage device is connected to the DC bus and to a DC emergency load. The energy storage device powers the DC power consuming device in conjunction with the source of DC power, and powers the DC emergency load when source of power, or limited sources of power, (e.g. solar) other than the energy storage device is available to the DC power consuming device.

In another embodiment, the invention comprises a DC building electrical system including a DC power consuming device connected to a DC bus. A source of DC power is connected to the DC bus and powers the DC power consuming device. An energy storage device is connected to the DC bus and to the motor vehicle. The energy storage powers the DC power consuming device in conjunction with the source of DC power, and powers the motor vehicle.

In another embodiment, the invention comprises a DC building electrical system including a DC power consuming device connected to a DC bus. A source of DC power is connected to the DC bus and powers the DC power consuming device. An energy storage device is connected to the DC bus and powers the DC power consuming device in conjunction with the source of DC power. A DC power control system selectively charges and discharges the energy storage device based on a current state of charge of the energy storage device and a predetermined target state of charge of the energy storage device.

In another embodiment, the invention comprises a microgrid system arrangement including a photovoltaic array producing a DC voltage on a DC bus. A DC power supply produces DC voltage on the DC bus from AC voltage received from a utility grid. A DC power consuming device is connected to the DC bus. A controller controls amounts of DC power provided to the DC bus by the photovoltaic array and by the DC power supply.

In another embodiment, the invention comprises a DC building system employing an energy storage device, wherein the energy storage device, via a common power network, supplies DC power 1) powering DC building loads in combination with at least one other DC power source (e.g., a renewable energy DC power source or an AC grid); and 2) powering DC emergency loads for a predetermined period when no other power is available.

In another embodiment, the invention comprises a DC building system employing an energy storage device, wherein the energy storage device is used to power a mobile device used within the building (e.g., a vehicle such as a fork lift or a golf cart).

In another embodiment, the invention comprises a DC building system employing an energy storage device, wherein the DC building system includes a DC power control system that selectively charges and discharges the energy storage device during non-emergency periods based on a state of charge (SOC) of the energy storage device and a predetermined emergency SOC.

In another embodiment, the invention comprises a DC building system employing an energy storage device, wherein the DC building system includes a DC power control system that charges the energy storage device using excess power available from a renewable energy DC power source.

In another embodiment, the invention comprises a DC building system employing an energy storage device, wherein the DC building system includes a DC power control system that when a state of charge (SOC) of an energy storage device drops below a predetermined SOC: selectively adjusts a variable DC load so that a total load on a solar device is less than an available power of the solar device; and charges the energy storage device to above the predetermined SOC.

In another embodiment, the invention comprises a DC building system employing an energy storage device, wherein the DC building system includes a DC power control system that when a state of charge (SOC) of an energy storage device drops below a predetermined SOC: controls a discharge rate of the of the energy storage device by selectively reducing or discontinuing operation of one or more variable DC loads based on a building ambient condition (e.g., amount of sunlight) and a corresponding predetermined building condition (emergency interior lighting level).

In another embodiment, the invention comprises a DC building system employing an energy storage device, wherein the DC building system includes a DC power control system that selectively reduces or discontinues operation of a variable DC load during emergency operation based on a duration of the emergency.

In another embodiment, the invention comprises a DC building system employing an energy storage device, wherein the DC building system includes a DC power control system that charges the energy storage device by discontinuing power to a motor/generator and operating the motor/generator in a regenerative mode during which kinetic energy is converted to DC power. The motor/generator may also directly power the DC loads from regenerative power, and provide all or part of the energy storage in the system.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
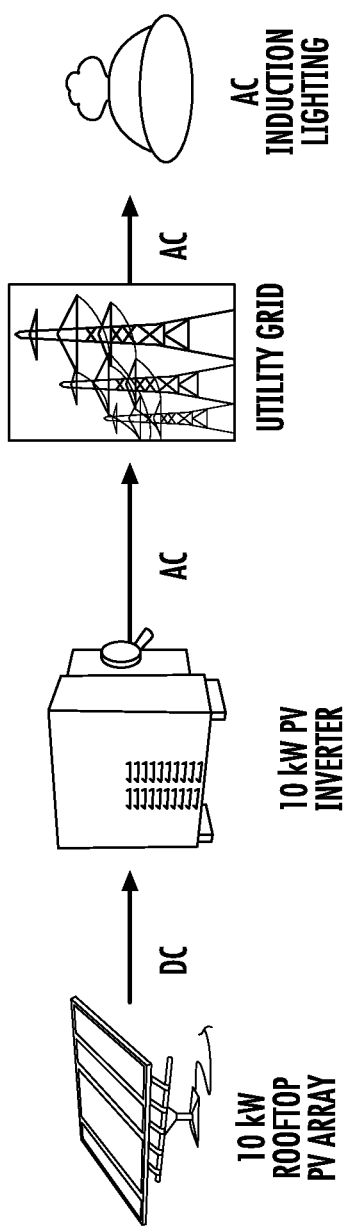
FIG. 1 is a block diagram of one embodiment of a conventional AC reference system.
Figure 2:
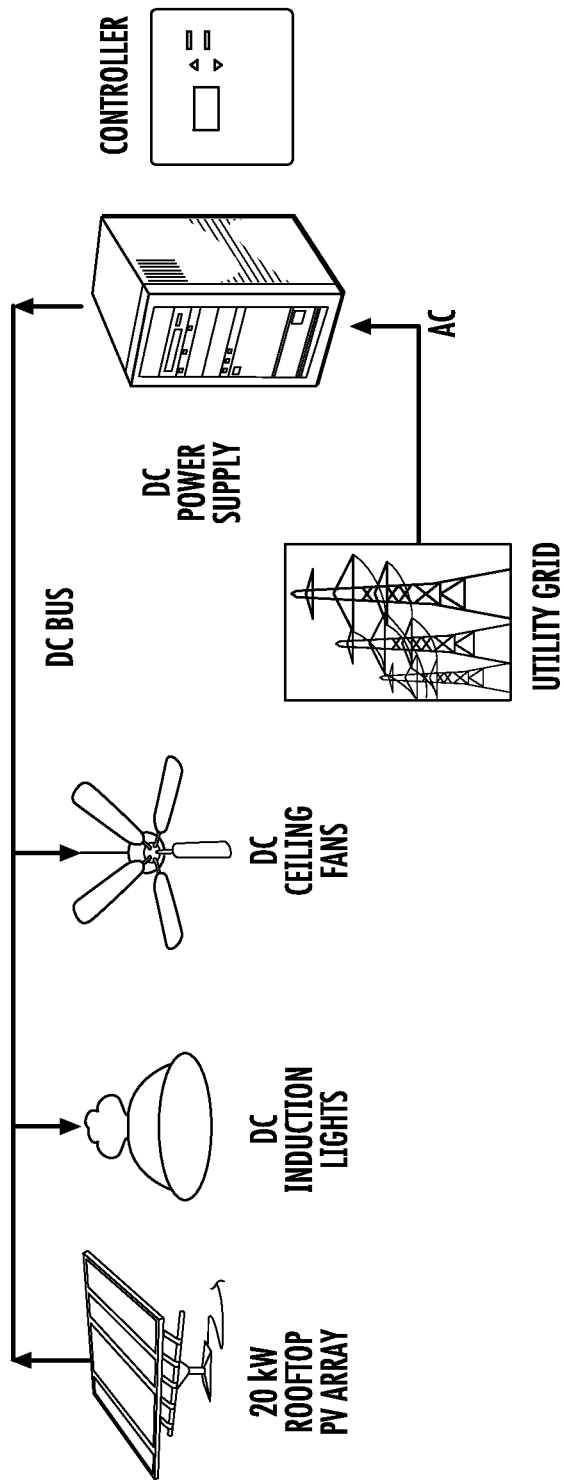
FIG. 2 is a block diagram of one embodiment of a core DC microgrid system architecture of the present invention.
Figure 3:
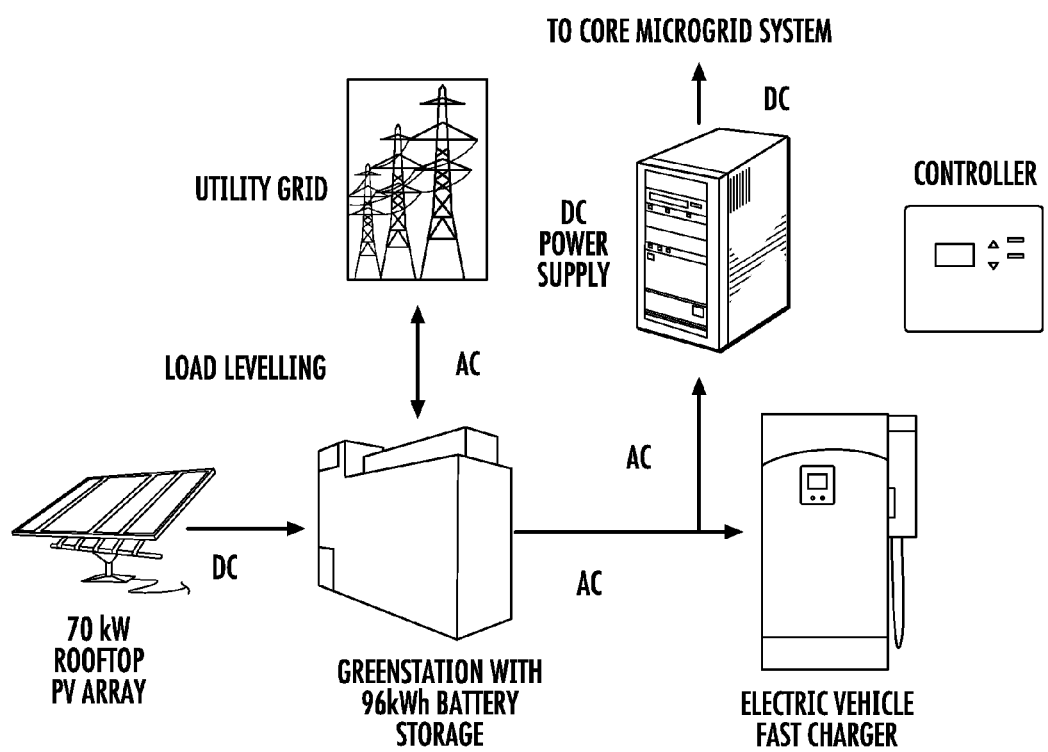
FIG. 3 is a block diagram of one embodiment of an enhanced DC microgrid system architecture of the present invention.
Figure 4:
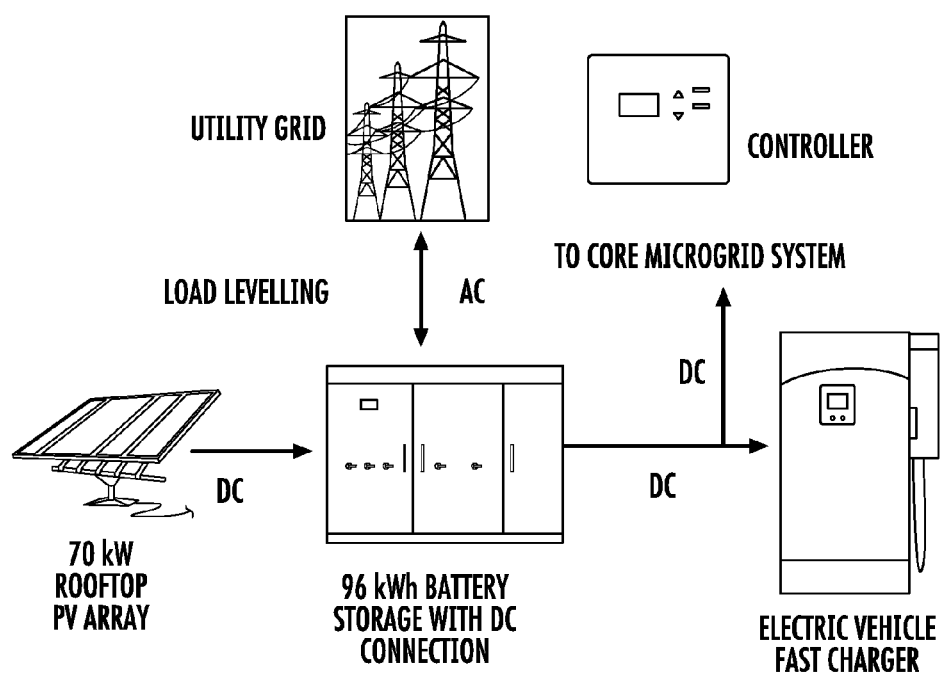
FIG. 4 is a block diagram of another embodiment of an enhanced DC microgrid system architecture of the present invention.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

The present invention may: 1) showcase the viability and optimize the performance of a building-level DC microgrid subsystem, 2) validate the efficiency improvements of DC-powered components relative to conventional AC components when powered by PV, 3) showcase the DC microgrid system's impact on energy security by providing backup power for mission-critical activities while minimizing the need for other backup energy sources, and 4) demonstrate the added value of energy storage in AC and DC load-leveling scenarios.

In one embodiment, the invention provides a core DC microgrid which utilizes PV energy more effectively in common building loads. Another embodiment includes storage which may dramatically increase energy security. The DCMG-BEMP of the present invention addresses the limitations of current building electrical power distribution systems by implementing a separate DC electrical distribution microgrid and novel DC-based electrical loads. Directly utilizing DC power eliminates the multiple conversions (DC-AC and AC-DC) of typical AC systems. Most renewable energy production systems (solar, wind, etc.) are tethered to the utility grid and allow for no direct usage of the power produced. The core DCMG-BEMP system architecture is designed to optimize the amount of renewable power used locally within the building. This core system also eliminates the expensive and unreliable grid-tie inverter. The DCMG-BEMP is further differentiated from other DC microgrid applications by an Energy Management Gateway (EMG), which manages the integrated PV power production, DC loads, and DC sources to minimize the overall (grid and renewable) energy use and total cost of ownership (TCO).

The system architecture simplifies building electrical wiring by significantly reducing wiring conduit runs, as many of the DC-based components are either roof- or ceiling-mounted (including the PV array, lighting, and ceiling-mounted ventilation fans), and can utilize existing AC wiring for DC power, making the system well suited to retrofit as well as new construction applications. The DCMG-BEMP is suitable to many facility types, since lighting and HVAC are large energy users in most buildings. As such, the DC loads may be commercial high-bay lighting and a large industrial ceiling fan that improves HVAC system efficiency. This broad application base may allow market forces to realize economies of scale and further improve the cost-effectiveness.

Figure 5:
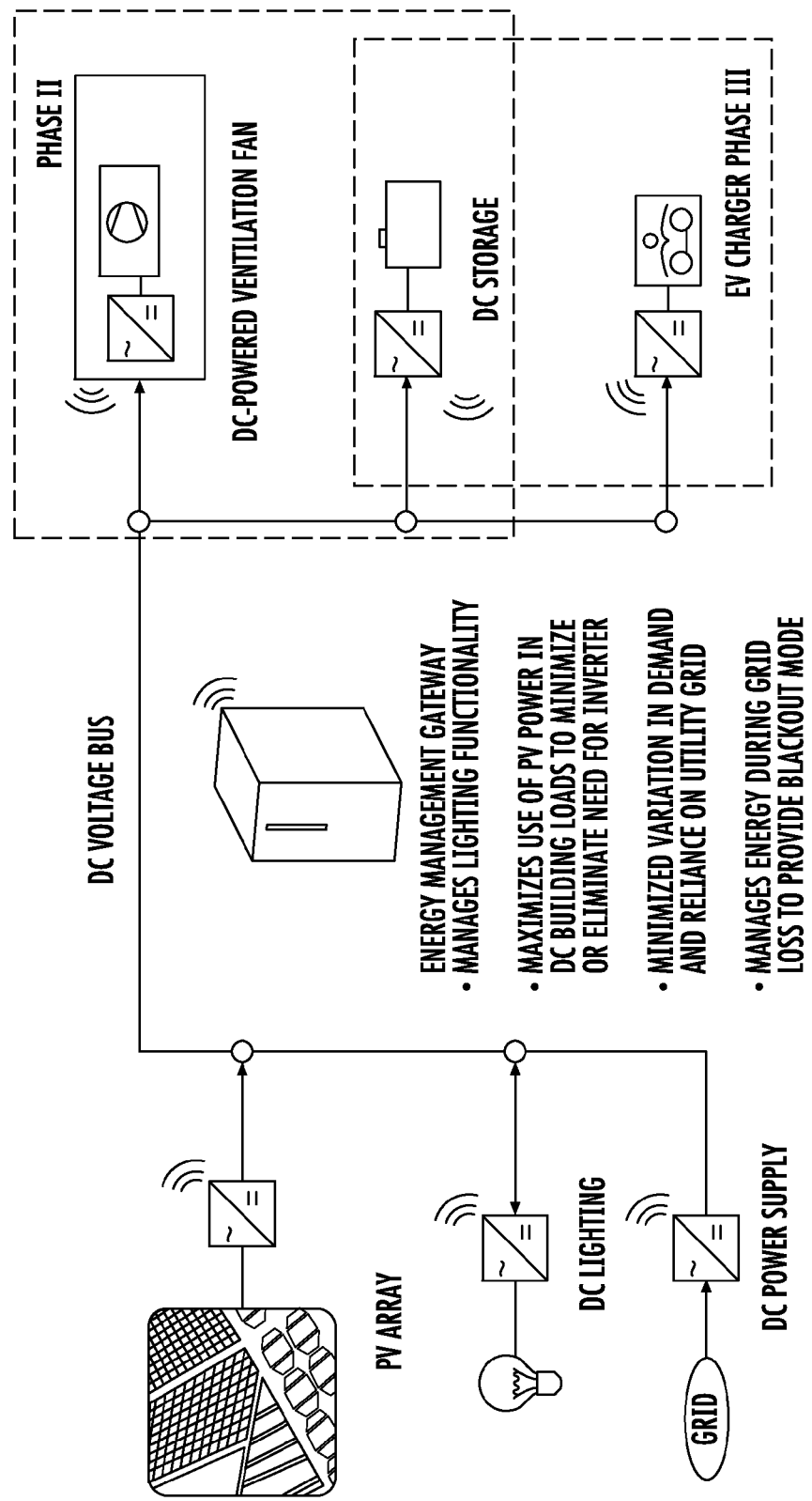
FIG. 5 is a block diagram of one embodiment of a DC microgrid building energy management platform of the present invention.
Figure 6:
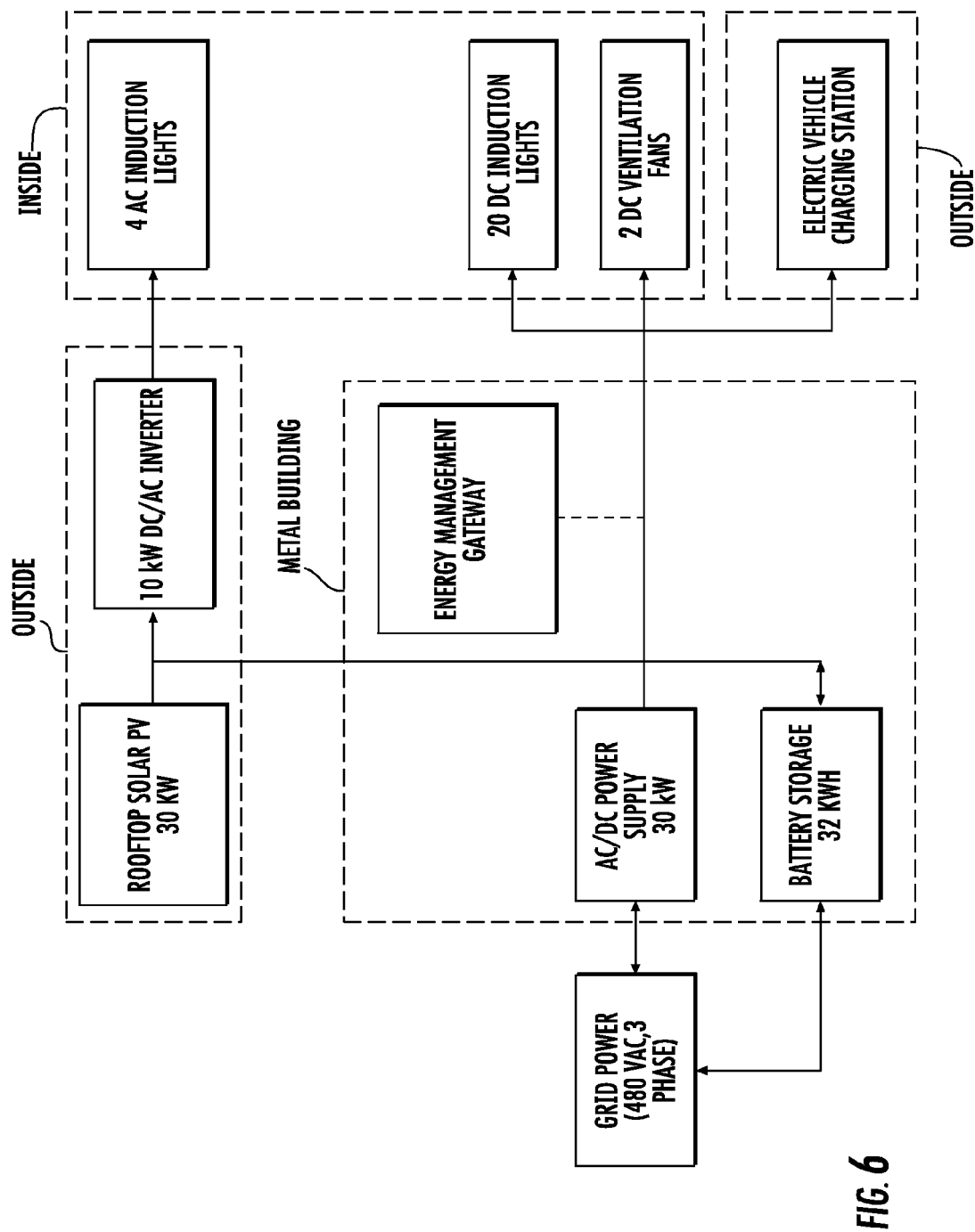
FIG. 6 is a block diagram of one embodiment of a DCMG-BEMP including a phased installation plan of the present invention.

A DCMG-BEMP of the invention may include three phases, as shown in FIG. 5, which is a high-level system schematic. A detailed block diagram is shown in FIG. 6. A core DCMG-BEMP system is first integrated in Phase I, which includes a PV array, DC power supply, and a DC-based high-bay induction lighting system. This core system is relatively small and is sized to match the DC loads, such that all PV production is immediately used. The result is a simple and cost-effective solution that does not require a grid-tied inverter. The core system may incorporate approximately 20 kW of PV depending on the amount of building loads that can be converted to DC, but (unlike the latter Phases) the core does not significantly enhance the facility's energy security.

Phases II and III build on the core system by adding additional PV generation and energy storage to dramatically enhance the facility's energy security and mission assurance during power outages. The managed energy storage system also performs load leveling/peak load reduction under normal operation to reduce utility costs. These phases require substantially more PV power, and the functionality of the grid-tie inverter is integrated into the storage system to upload excess PV and stored power to the grid. A net metering agreement may allow for the uploaded energy to offset utility-supplied energy. Phase II integrates a battery-based energy storage system, large-diameter DC-powered ceiling ventilation fans as an additional DC load, and added PV array capacity. Ceiling-mounted ventilation fans (24 inch diameter) may be used as DC load, but a DC HVAC system, for example, may also be used. The fan circulates air so the heated/air-conditioned air is uniformly distributed, and moving air provides more comfort to occupants. The result is that the HVAC system can be set to a lower or higher temperature (depending on the mode), and/or operates less often, using less energy while maintaining occupant comfort. Each fan requires 1.5 kW to operate (3 kW total for two fans), which is substantially less than the HVAC power reduction. Use of large ventilation fans can reduce air conditioning energy consumption by 36%, reduce heating energy consumption by 20+%, and elevated air speed from a large fan can increase productivity by 9% in non-air conditioned spaces.

Phase II integrates a battery storage system such as a Green Charge Networks (GCN) GreenStation battery storage system to provide emergency backup power to critical DC loads. The GreenStation may also demonstrate AC load-leveling features by actively using the system's energy storage capacity to level the building's demand for utility grid power when the system is not in emergency backup mode. Phase III integrates an additional PV generation and increased battery capacity as well as an electric vehicle charging stations (EVCS). The DCMG-BEMP-connected EVCS further supports mission-critical activities by providing the ability to charge vehicles even during power outages, such that personnel mobility can be maintained throughout.

The Energy Management Gateway (EMG) performs overall system management and interfaces with existing building network infrastructure (e.g., LonWorks) if needed. The EMG provides maximum power point tracking (MPPT) algorithms that keeps the PV System operating at the highest possible efficiency regardless of weather and load conditions. The EMG, together with the GCN GreenStation battery energy storage, also manages the solar-synchronized loads (SSL) function, including AC and DC load-balancing and load-shedding to reduce non-critical loads during periods of reduced PV power (without affecting critical lighting or other loads). The EMG control software may be optimized and implemented to manage the DC power sources, lighting and fan systems, GreenStation energy storage, and EVCS via secure, wired connections.

Supplemental grid power is supplied to the DC microgrid via an AC-to-DC power supply when PV power alone is insufficient, and when stored power is being conserved. Power flow is controlled by the EMG to optimize use of grid vs. solar vs. stored power. The EMG-controlled power supplies respond instantaneously to attenuate "peak-to-valley" changes during rapidly varying solar energy production, such as during cloud-shading events. The EMG also determines and manages times at which it is most effective to charge the battery system from the PV array and/or utility grid, as well as times at which it is most effective to export PV and/or stored power to the building's other AC loads. The result minimizes grid-based energy and power demands and maximizes renewable energy usage. The GreenStation's energy storage system's energy-buffering capability also enables the Phase III EVCS installation to be done without "last-mile" grid upgrades, thus reducing costs.

The invention may provide a modular, scalable, and optimized DCMG-BEMP system flexibly designed for broad commercial applications. An efficient DC infrastructure and EMG-managed device connectivity is an important DCMG-BEMP feature, as it enables simplified DC microgrid "islanding" for off-grid operation. Islanding of the DC microgrid allows critical loads to be unaffected during blackouts by using PV and/or stored energy. High-priority loads such as lighting are reduced according to the facility's emergency-mode requirements while lower-priority loads are allocated energy as it becomes available. As a result, the reliance on other backup power sources is eliminated or significantly reduced. This islanding capability is unique to the inventive system and an ideal fit for providing backup power at mission-critical facilities and emergency shelters. Conventional grid-tied inverter-based PV systems cannot provide this backup functionality, as these systems turn off when grid power is lost. A programmable emergency power mode may be integrated into the EMG to manage tradeoffs between building lighting and ventilation levels, battery storage capacity, and weather effects.

In one embodiment, the induction lights (Everlast), PV panels (Bosch), GreenStation (GCN), and DC power supply (Emerson) are all UL-certified commercial units in serial mass-production. The equivalent DC version of the Everlast induction light (e.g. ballast, light, enclosure) may also be UL certified. The EMG may either be an off-the-shelf solution (e.g. Tridium) or may utilize mature software platforms (Visual Rules and Inubit) operating on UL-certified hardware. The large commercial ceiling fans (Delta T Corp) are mass-produced. The fans are AC-powered, but utilize variable frequency drives (VFD) that operate internally on DC power. Either the DC circuits of the existing VFD may be utilized, or the VFD may be replaced/supplemented with a commercially available DC-input device. In any case, the complete DC fan unit may be UL certified and added in Phase II. A commercially available EV fast-charging station (e.g. Eaton DC Quick Charger) may be installed in Phase III. The charger may have an AC interface with the GreenStation. Integrating the EV fast charging station with a DC connection to the GreenStation may maximize the microgrid's benefits and capabilities.

Phase I: Install core DC microgrid including PV and DC lighting. Compare performance vs. conventional AC system to validate economic advantages.

Phase II: Expand core system functionality to include large DC ceiling fan. Add first elements of enhanced system to demonstrate value of storage in improving energy security. Demonstrate emergency backup and load-leveling with limited Phase II PV and storage capacity.

Phase III: Increase capacity of enhanced system by adding more PV and storage, and install EV charging station. Demonstrate full value of load-leveling and energy security features including EV charging during blackout conditions.

The present invention may:

Demonstrate the total cost-of-ownership savings the system provides as a result of improved energy efficiency, lower upfront cost, lower operating and maintenance (O&M) costs, and demand charge reductions. The invention may validate the enhanced facility energy security from the DCMG-BEMP relative to a conventional AC infrastructure. A small, conventional 10 kW PV reference system with AC inverter and AC induction lighting may be constructed next to the DC PV array as a comparison to the core DC microgrid. Energy use and power demand of the DC-microgrid and AC-reference systems may be directly compared to quantify savings, as well as compared to the current system (using historical data) to quantify the impact of the lighting upgrade. HVAC energy usage for the baseline system and that integrating the DC ventilation fans may be analyzed to quantify the energy-consumption impact. O&M costs for the demonstration system may be compared with the current infrastructure to quantify the operating-cost and reliability impacts. Initial economic analysis indicate the core DC microgrid power-management functionality may have a net present value that is less and a Savings to Investment Ratio (SIR) that is higher than a comparable AC system.

Demonstrate the impact of effective optimized use and management of renewable solar power to reduce grid-supplied energy and power demands. Initial estimates based on simulation results of the proposed core system indicate 8% to 12% less PV infrastructure (panels, racking, wiring, etc.) in terms of kilowatts are needed to provide the same PV energy to the DC-based lighting as compared to the AC reference system. This assumes the minimum Phase I system on the demonstration facility, in which a small, 10 kW PV or 20 kW PV system is used in a highly cost-effective way to supplement the lighting needs.

Demonstrate the DCMG-BEMP system's unique energy-security enhancement by providing backup power for mission-critical activities without requiring outside energy sources (e.g. liquid/gaseous fuels). Tradeoffs between the PV array size and battery storage versus energy security may be demonstrated in terms of the probability of having sufficient power to keep the facility functional throughout the day and night under various weather conditions.

Two DC-based microgrid system architectures with broad application may be demonstrated. The first "core" DC microgrid system may utilize a relatively small PV array that may use PV energy far more cost-effectively than conventional AC systems when paired with DC loads, such as lighting and ventilation fans. This system has broad application and is especially suited to buildings operating seven days a week. The second "enhanced" system is intended for buildings where energy security is of primary importance. An optional energy storage system and additional PV array are used to add a scalable amount of energy security, reducing or completely eliminating the need for on-site fuel storage for diesel generators. In addition to the backup power functionality, the battery storage system's ability to provide utility demand charge reduction and load leveling (while also reducing the need for infrastructure upgrades) may be demonstrated.

Additional Benefits: The increased renewable energy usage may improve air quality and energy use.

The DCMG-BEMP may effectively reduce overall total cost of ownership for a building, maximize the use of renewable PV energy production to minimize grid-supplied energy, improve the energy-security and backup-power capabilities relative to conventional AC infrastructure, and demonstrate the added value of energy storage for building load leveling and peak load reduction.

TABLE 1

Quantitative Performance Objectives Summary

| Performance Objective | Metric | Data Requirements |
|---|---|---|
| Renewable Energy Usage | Renewable Energy Used on Installation (kWh and MMBtu) | Meter readings of renewable energy used by installation; measured values from data acquisition system |
| Facility Utility Energy Usage (Electric, Natural Gas, etc.) | Energy Usage (kWh and MMBtu) | Historical utility statements (current system); data acquisition system measurements of facility energy usage |
| Peak Electric Utility Load Reduction | Monthly Peak Power (kW) | Historical utility statements (current system); data acquisition system measurements of facility peak power |
| Annual Operating Costs (includes energy usage and maintenance costs) | Lighting and HVAC Energy Costs ($/year), Maintenance Costs ($/year) | data acquisition system measurements of current facility lighting energy; lighting maintenance records (parts and labor costs) |
| Facility Energy Security/Backup Power Availability | Time without Utility Grid Power during Grid Interruptions (hours) | Time-stamped data acquisition system measurements of facility energy use during power outages |
| Ensure Lighting Output Fulfills Best Practice Standards | Candle Power of Light at Ground Level (target is 50 foot candles) | Handheld light intensity meter |
| System Scalability and Transferability | Number of Applicable Facilities in Current Inventory | Detailed facility inventory data (square footage, building type and use, ceiling height, annual electric usage, etc.) |
| System Economics | Internal Rate of Return (IRR) (%), Annual Cost Savings ($), Payback Period (years) | Utility statements; installation and operational costs; discount rates; usable lifetimes; etc. |

Phase I—Core DCMG-BEMP system with an approximately 20 kW PV array to power DC-based lighting. The size of the system may be based on the amount of lighting loads that can be converted to DC. A small (10 kW) AC-based reference system may be used to collect baseline data for direct comparison.

Phase II—The Phase I system plus an additional 35 kW PV, a 32 kWh battery storage system, and a DC-powered large-diameter ceiling fan.

Phase III—The Phase II system plus an additional 35 kW PV (for 100 kW total) PV, an additional 64 kWh of battery storage (for 96 kWh total), and a fast-charge electric vehicle charging station.

a) Phase I

Phase I may include the following:

I-1. Baseline the energy usage and lighting level of the current AC lighting for comparison to the Phase I system. Begin long-term data acquisition of the HVAC system and a complete building electrical energy profile to use as a baseline in the Phase II load-leveling demonstration.

I-2. Demonstrate how the core DC microgrid system operates without a grid-tied PV inverter and more efficiently transfers energy to DC lighting loads (relative to the conventional reference PV system utilizing an inverter and AC-based lights).

I-3. Update the economic analysis comparing the DC microgrid relative to an equivalent AC system by incorporating the measured efficiency improvements, installation differences, and projections of reliability/maintenance differences.

I-4. Collect summer and winter HVAC temperature settings prior to installation of DC fan in Phase II.

(1) Task PI-1—Demonstration Site Selection

The ideal DCMG-BEMP system site is a large, high-ceiling building (such as a warehouse, gymnasium, commissary, vehicle maintenance garage, aircraft hangar, etc.) that can accommodate a PV array and high-bay lighting. The ideal facility would also be used as an emergency shelter. The ideal building has a large roof, seven-days-a-week operation, and an electrical consumption pattern generally aligned with the PV system's energy production. Daily operation is critical because PV array in the core system is sized to directly power the lights, eliminating the need for a grid-tie inverter to feed power back into the grid. The DCMG-BEMP and EMG are flexible, scalable technologies that optimize energy use in all climate zones and building sizes, from small structures up to entire clusters of buildings.

(2) Task PI-2—Quantify Baseline System Performance

Energy Usage/Power Demand—A data acquisition system may be installed to collect electricity usage data for system components as well as the whole facility to characterize the baseline utilization profile. These data sets may be analyzed to determine the baseline system performance, including daily, monthly, average monthly, and annual energy usage (kWh and MMBtu), electricity demand (kW), and demand charges ($), as well as the frequency of utility grid failure events (i.e. blackouts). This information may also be used to optimize the EMG control software for the demonstration site's operating characteristics.

Operating and Maintenance Costs—Historical maintenance and replacement costs (including parts and labor) may be collected and analyzed to determine typical, annualized equipment-maintenance costs. This information may be used within the DCMG-BEMP system's cost-effectiveness and payback calculations.

Light Output Test—An evaluation of floor-level lighting may be done using a handheld light intensity meter. Data points may be taken along a virtual grid across the gymnasium floor to capture any potential variations. The test may be performed once to quantify the induction lighting's output goal (Task PI-3).

(3) Task PI-3—Phase I System Integration Design and Installation

To allow for a direct comparison, the Phase I system may be segmented into two subsystem circuits: (1) the core DC system (min. 20 light fixtures), and (2) a smaller reference AC system (4 light fixtures) that may serve as a control to determine the DC system's reduction in lighting power consumption. This AC system may allow for energy usage comparisons in validating the DCMG-BEMP system's performance. This reference system requires the addition of a PV inverter to provide energy to the AC-powered lights.

The Phase I system includes installation of: (1) a 30 kW rooftop solar PV array, (2) an Emerson NetSure 4015 System 30 kW, 400 V AC-DC power supply, (3) a Bosch Energy Management Gateway, (4) a Solectria 10 kW PV inverter, (5) min 24 Everlast EHBUS-RC 250 W induction lights (20 DC-powered and 4 AC-powered), and (6) the required electrical wiring. A lighting study was completed to determine the number and power rating of the induction lights. The current 400 W metal-halide light fixtures may be replaced, with wiring reused wherever possible. Understanding how existing AC wiring can be reused for DC circuits is very important for future retrofit applications. The design may meet current electrical codes and standards, as well as Fort Bragg's design guidelines. All of the components used may be UL certified.

Certain aspects of the hardware design (such as available space, wiring, etc.) may be designed anticipating Phase II and III tasks. FIG. 6 provides a system schematic, including the phased installation plan for the major hardware elements. This phased installation approach ensures that sufficient capacity is available for each phase, while evening out monetary expenditures.

(4) Task PI-4—Phase I DCMG-BEMP Operation, Data Collection, and Analysis

System Performance Analysis—Once installed and commissioned, the DCMG-BEMP system may be operated to collect electricity usage data. Data collection may continue to ensure that seasonal changes are accurately captured. The EMG may serve as a data acquisition system, recording the energy and power usage throughout the demonstration. Since electrical demand charges are typically defined as the highest average 15-minute peak power in a given billing cycle, the data acquisition algorithm may be flexible to capture regular interval data (e.g. 1-second or 5-second data). The same data parameters used for baseline system analysis may be collected in this task, including energy usage (kWh and MMBtu) and demand (kW) data. This data and non-electricity utility statements (e.g. natural gas) may be analyzed to determine the DCMG-BEMP system's performance, including daily, monthly, average monthly, and annual energy usage ($kWh_{Total}$, $kWh_{Grid-Supplied}$, and MMBtu), renewable energy usage (kWh), electricity demand ($kW_{Total}$ and $kW_{Grid-Supplied}$), and demand charges ($).

b) Phase II

Phase II may include the following:

Add a DC fan as an additional load within the DC microgrid. The fan can reduce the heating and cooling loads of the current HVAC system, thus saving energy.

Additional energy security may be offered by adding a GCN GreenStation with 32 kWh of battery storage, as well as 35 kW of PV. Specifically, the amount of backup time available during a blackout at different emergency lighting levels and various weather conditions may be increased.

The load-leveling capabilities may be offered by linking the GreenStation to the building AC circuits, offering the ability to compensate for wide, rapid variations in PV power generation and building loads (from HVAC, etc.) by discharging and charging the battery storage appropriately.

The DC fan's speed can be varied to match the amount of PV power available (on a daily, seasonal, and/or weather-influenced basis) to further level the building load profile.

(1) Task PII-1—Phase II System Integration Design and Installation

The Phase II system builds on the Phase I system by adding: (1) 35 kW of rooftop solar PV array capacity (65 kW total), (2) a 32 kWh GCN battery storage system, (3) two 24'-diameter ventilation fans, and (4) EMG modifications. The draft SOW includes the installation upgrade plans for these components. The same installation subcontractors used in Phase I may be used in both Phase II and Phase III.

(2) Task PII-2—Phase II DCMG-BEMP Operation, Data Collection, and Analysis c) Phase III Phase III may include the following:

Additional energy security may be offered by increasing the GCN GreenStation capacity to a total of 96 kWh of battery storage and 70 kW of PV. Specifically, the amount of backup time available during a blackout at different emergency lighting levels, demonstrated under various weather conditions may be increased.

Additional load-leveling capabilities may be due to the increased GreenStation capacity.

The addition of a fast-charge EVCS to the GreenStation can effectively be used as part of the load-leveling strategy.

The EVCS can continue to be used during an emergency blackout scenario by utilizing PV and stored energy, further increasing the energy security of the demonstration site.

A battery storage system and EVCS with DC connectivity offers the same functionality as the current AC-powered scenario, while offering improved efficiency during backup and charging operations.

(1) Task PIII-1—Phase III System Integration Design and Installation

The Phase III system builds on Phase II's system by adding: (1) 35 kW of rooftop solar PV array capacity (100 kW total), (2) an additional 64 kWh of GCN battery storage (96 kWh total), (3) a fast-charge EVCS, and (4) EMG modifications. The draft SOW includes the installation upgrade plans for these components.

(2) Task PIII-2—Phase III DCMG-BEMP Operation, Data Collection, and Analysis

System Performance Analysis—The same data parameters used in baseline system analysis, Phase I, and Phase II may be collected in this task, including energy usage and demand data. This data and non-electricity utility statements may be analyzed as detailed above (in the System Performance Analysis of Task PI-4) to determine the DCMG-BEMP system's performance under Phase III operation.

a. Load-Leveling/Peak Power Reduction—Two system configurations: (1) with a fully functional GreenStation utilizing the energy storage and the EMG's energy-management algorithms managing the energy usage of all DC microgrid components (lights, fans, energy storage, and EVCS), and (2) with the energy storage disconnected from the building and the EMG's energy-management algorithms managing the energy usage of all remaining DC microgrid components (lights, fans, and EVCS).

b. Avoidance of Technical Risks

The control algorithms are developed such that, if a code failure occurs, the system may fail in a way that allows DC devices to be powered from the grid to ensure building loads are not interrupted.

The battery system is not in the critical path of electrical energy transfer (i.e., from the DC power supply and PV array to the lighting system), so building functions may continue to operate normally even as the battery's capacity decreases throughout its lifetime. The energy storage system may be tested periodically without affecting building functionality; any faults or reductions in capacity may be reported accordingly.

The installation assumes that the existing AC wiring can be reused for the majority of the DC microgrid wiring. If this is not possible, separate DC wiring runs may be needed (requiring additional installation hardware and labor, permitting/inspections, etc.).

The ability to island the facility from the utility grid during a power outage or an emergency is an inherent DCMG-BEMP feature, as it does not require a grid-tied PV inverter. Islanding allows the building's DC loads to continue functioning during such events, enhancing the facility's energy security. Depending upon building application, the emergency power mode may reduce or eliminate the need for backup generators (and their associated fuel usage). The inventive system is scalable and ideally suited to large, flat-top buildings with high-bay lighting.

The ceiling fan, especially the large commercial variety made by companies like Delta T, may be an appropriate DC load to complement DC lighting (or standalone) in the inventive DC microgrid. The ceiling fan is a load that inherently synchronizes very well to the solar PV generation, and can also be varied in speed to match the desired load conditions (for example, to help get the system to maximum power point (MPP) of the PV at any exact moment).

The DC fan's speed can be varied to match the amount of PV power available (on a daily, seasonal, and/or weather-influenced basis) to further level the building load profile. Ceiling fans are especially well suited to PV power generation because they generally run at a higher speed in summertime (to help cool building occupants, allowing a higher air-conditioning thermostat setting, overall saving HVAC energy cost), and run at a lower speed in wintertime (just to bring hot air from the ceiling down to the floor level where the occupants are, allowing the heating system to run less often, with less heat loss through the ceiling, overall saving HVAC energy). This can be done in the same rotational direction winter/summer or reversing directions with season (typically blowing air down in summer). If the profile of the summertime/wintertime fan speed and resulting energy use is matched to the solar PV generation, this can result in a more optimized size of the PV array for the DC microgrid, since the case where substantially all the PV energy from the PV array is consumed locally through DC loads may result in the best economics for the DC microgrid and shortest payback for the PV elements. Synchronization of the fan load to other variations in PV generation (daily variation from morning to night, variations due to weather such as short-term cloud events, etc.) are also possible for both DC microgrid configurations and conventional AC systems where an AC PV inverter is connected to an AC fan. This synchronization can also be coordinated with the other building loads, and especially in the DC case can be part of a system-level PV power point tracking system which would keep the PV operating at the optimum power point for the current situation. In any case (AC fan load or DC fan load), consuming locally generated PV energy locally in the building loads whenever possible results in lower economic and energy losses which may be associated with consuming power from the utility grid that is generated remotely, and associated with sending excess PV power out to the grid, only to have a need for that same PV energy in the building loads at a later time.

Figure 7:
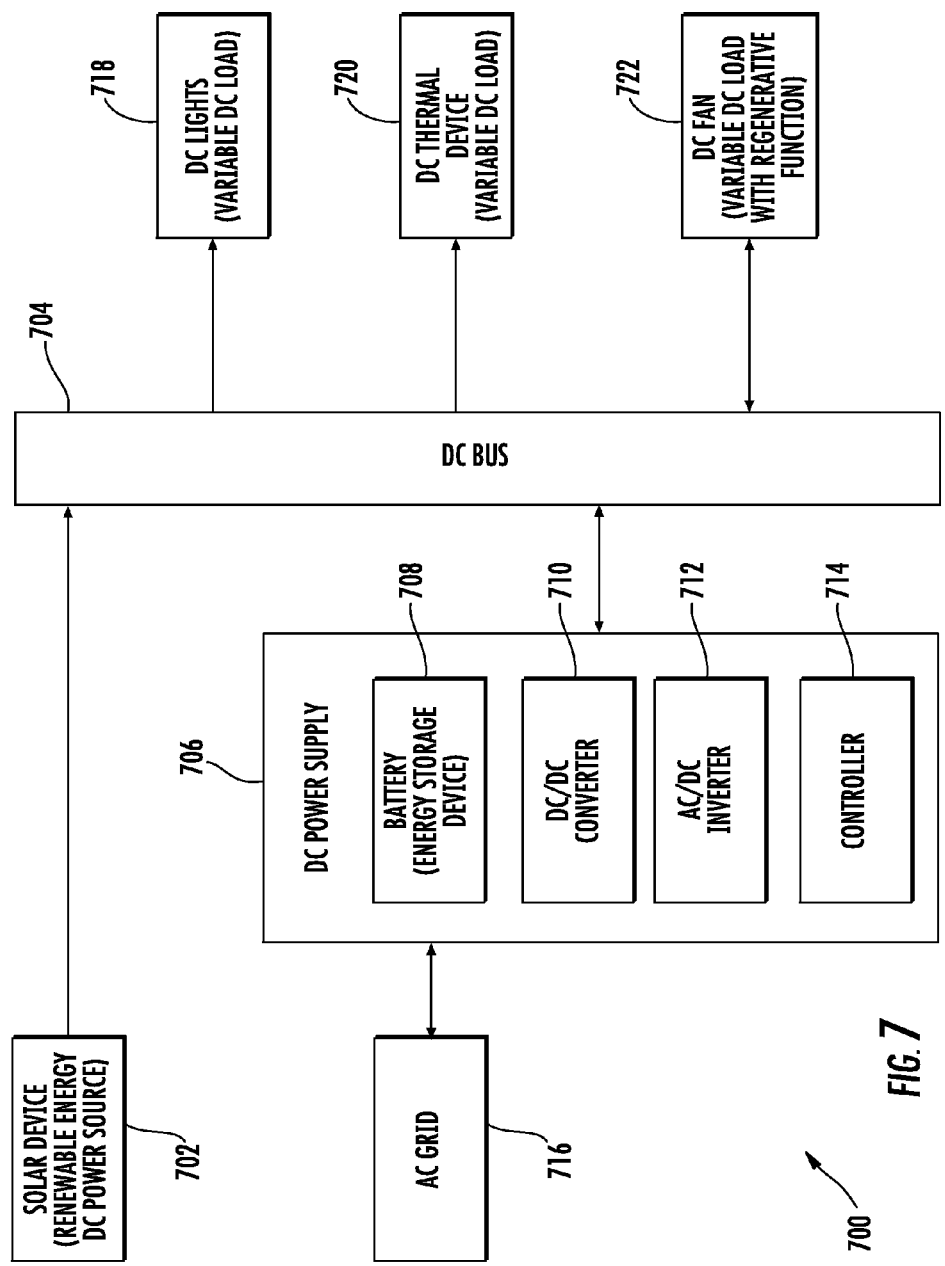
FIG. 7 is a block diagram of one embodiment of a DC building system of the present invention.

FIG. 7 illustrates a DC building system 700 including a renewable energy DC power source in the form of a solar device 702 whose output is connected to a DC bus 704. In bi-directional communication with DC bus 704 is a source of DC power in the form of a DC power supply 706. DC power supply 706 may include an energy storage device in the form of a battery 708, a DC/DC converter 710, an AC/DC inverter 712, and a processor in the form of a controller 714. As used herein, the term "DC power supply" may encompass any device that provides DC electrical energy converted from another form of energy, such as AC electrical energy, or chemical energy in the case of a battery.

Both solar device 702 and DC power supply 706 may provide DC electrical power to DC bus 704. An AC grid 716 may provide AC power to DC power supply 706, which AC/DC inverter 712 may convert to DC power. DC power consuming devices or variable DC loads in the form of DC lights 718, DC thermal device 720, and DC fan 722 may draw DC power from DC bus 704. DC fan 722 may include a motor or generator that is capable of operating in a regenerative mode.

Figure 8:
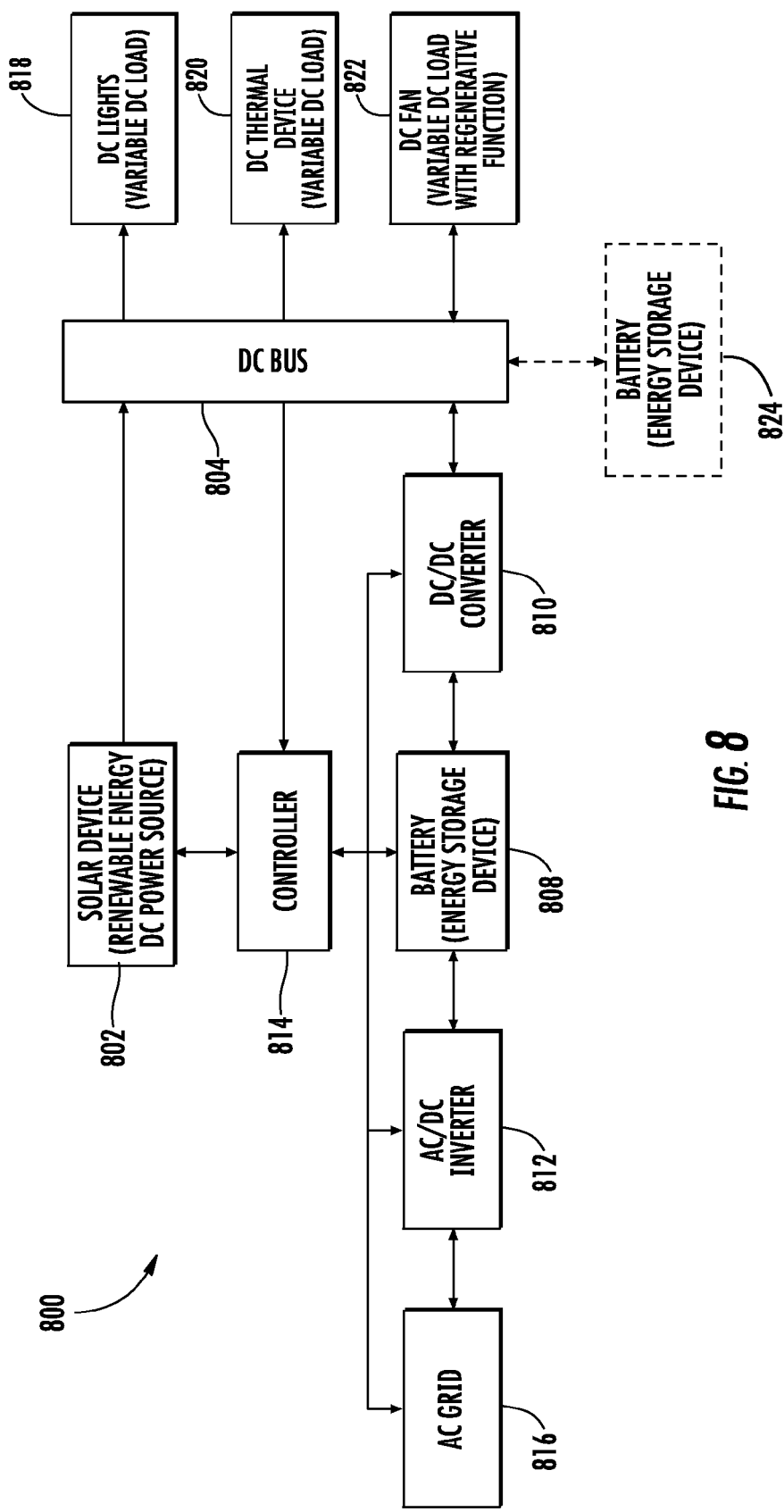
FIG. 8 is a block diagram of one embodiment of a DC power control system of the present invention.

FIG. 8 illustrates a DC power control system 800 including a renewable energy DC power source in the form of a solar device (e.g., a photovoltaic array) 802 whose output is connected to a DC bus 804. Solar device 802 and DC bus 804 are in communication with a source of DC power in the form of a DC/DC converter 810 and an AC/DC inverter 812, and with a processor in the form of a controller 814. An energy storage device in the form of battery 808 may provide DC power to DC bus 804.

Solar device 802, battery 808, and an AC power source in the form of an AC grid 816 may supply DC electrical power to DC bus 804. AC/DC inverter 812 may convert AC power supplied by AC Grid 816 to DC power. DC power consuming devices or variable DC loads in the form of DC lights 818, DC thermal device 820 (e.g., a freezer), and DC fan 822 may draw DC power from DC bus 804. Accordingly, it will be appreciated the DC power consuming devices or variable DC loads can receive power from one or more of solar device 802, battery 808, and AC grid 816 via a common power distribution circuit (not shown). DC fan 822 may include a motor or generator that is capable of operating in a regenerative mode. Optionally, one of more energy storage elements 824 may be connected independently and/or directly to DC bus 804.

Figure 9:
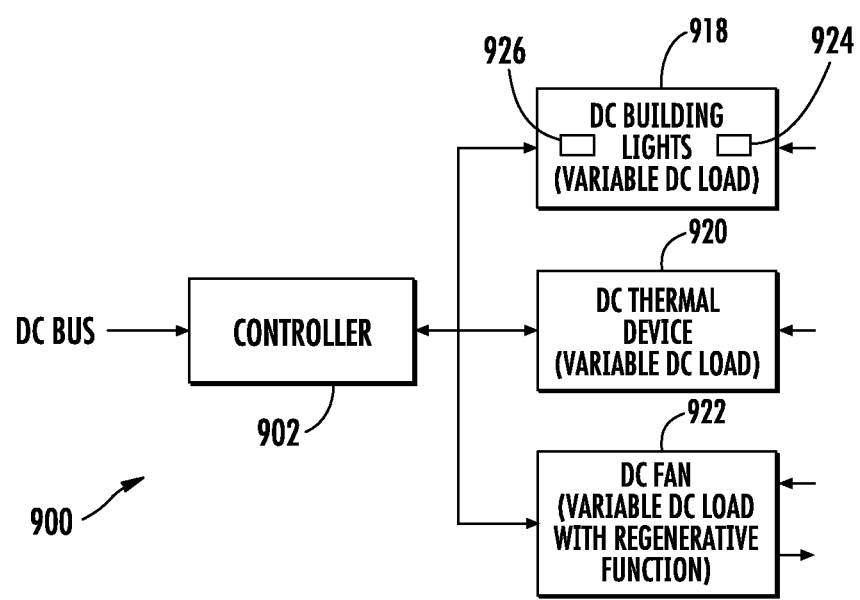
FIG. 9 is a block diagram of one embodiment of a DC load control system of the present invention.

FIG. 9 illustrates a DC load control system 900 which may be incorporated into DC building system 700 and/or DC power control system 800. Accordingly, DC load control system 900 will be described with reference to components of power control system 800. DC load control system 900 includes a second controller 902 interconnecting the DC bus and DC power consuming devices or variable DC loads in the form of DC building lights 918, DC thermal device 920, and DC fan 922. Each of these variable DC loads may draw DC power from the DC bus 804. DC building lights 918 may include emergency lights 924 and other lights (e.g., non-emergency lights) 926. Emergency lights 924 may draw less power than the entirety of DC building lights 918 and may be a subset of DC building lights 918. Emergency lights 924 and DC fan 922 may function as DC emergency loads which operate when neither the solar device nor the other source of DC power 810, 812 are operable. For example, the energy storage device 808 may power each of the DC power consuming devices 918, 920, 922 in conjunction with solar device 802 and the other source of DC power 510, 512 under normal non-emergency operating conditions. However, under emergency operating conditions (e.g., when a storm has disabled the AC grid and the solar device), the energy storage device 808 may power the DC emergency loads 922, 924 for a predetermined period of time when no source of power other than the energy storage device 808 is available to the DC power consuming devices 918, 920, 922. Second controller 902 may respond to solar device 802 and the DC power supply 810, 812 being inoperable for a threshold length of time by reducing a level of power drawn by at least one of the DC power consuming devices 918, 920, 922.

DC fan 922 may operate at a slower speed in an emergency mode than in a non-emergency mode. In another embodiment, emergency lights are the same as non-emergency lights, but the lights draw less power and are dimmer in an emergency mode than in a non-emergency mode. In another embodiment, the emergency lights are a subset of the non-emergency lights.

Controller 714 and/or controller 814 may function as a DC power control system which charges the energy storage device during time periods in which the source of DC power is operable, and which discharges the energy storage device during time periods in which the source of DC power is inoperable. The charging and discharging may be based on a current state of charge (SOC) of the energy storage device and a predetermined target SOC of the energy storage device. For example, charging of the energy storage device may take place only if and/or whenever the current SOC or voltage level of the battery is below a desired target SOC or voltage level of the battery. Discharging of the energy storage device may take place only if and/or whenever the current SOC or voltage level of the battery is above a desired target SOC or voltage level of the battery. The predetermined target SOC may be a state or level of charge or voltage that is sufficient to solely power at least one of the DC power consuming devices for a predetermined duration of time while the source of DC power is inoperable (e.g., during a lightning storm).

The DC power control system 800 may charge the energy storage device 808 by using excess power from the renewable energy DC power source 802. The DC power control system 814 may respond to the current SOC of the energy storage device dropping below the predetermined target SOC by adjusting at least one of the variable DC power consuming devices 818, 820, 822 such that a level of current drawn by the variable DC power consuming device 818, 820, 822 is less than a level of current sourced by the renewable energy DC power source 802, and such that the energy storage device 808 is charged to the predetermined target SOC by the renewable energy DC power source 802.

The DC power control system 800 may respond to the current SOC of the energy storage device 808 dropping below the predetermined target SOC by adjusting a discharge current rate of the energy storage device 802 by selectively reducing or discontinuing operation of at least one of the variable DC power consuming devices 818, 820, 822 dependent upon a building ambient condition and/or a corresponding predetermined building condition. In one embodiment, the building ambient condition includes a level of sunlight. In one embodiment, the corresponding predetermined building condition includes a desired emergency interior lighting level. In related embodiments, DC power control system 800 selectively reduces operation or discontinues one or more of DC lights 818 such that a level of light provided by DC lights 818 supplements the level of sunlight to meet the desired emergency interior lighting level. In this way, DC power control system 800 can control a discharge rate of battery 808 and, more particularly, can reduce the discharge rate by lowering a number of the DC lights 818 operating to meet the desired emergency interior lighting level.

The DC power control system 800 may respond to the source of DC power 810, 812 being inoperable for a threshold period of time by adjusting at least one of the variable DC power consuming devices 818, 820, 822 such that a level of current drawn by the variable DC power consuming device 818, 820, 822 is thereby reduced. Moreover, the DC power control system 800 may selectively reduce or discontinue operation of at least one of the variable DC power consuming devices 818, 820, 822 dependent upon a length of time during which the source of DC power 810, 812 has been inoperable.

The DC power control system 800 may charge the energy storage device 808 by discontinuing power to the motor or generator of the DC fan 822 and by operating the motor or generator in a regenerative mode in which kinetic energy of the motor or generator is converted to DC power.

The DC power control system 800 may control amounts of DC power provided to the DC bus 804 by the solar device 802 and by a DC power supply 810, 812 that is fed by the AC grid 816. Particularly, the DC power control system 814 may control how much power is provided by the solar device 802 and how much power is provided by the DC power supply 810, 812 dependent upon how much power is needed by the DC power consuming devices, 818, 820, 822, the cost of the AC power from the grid 816, how much power is available from other sources, such as an energy storage device 808, a motor operating in a regenerative mode, etc.

Figure 10:
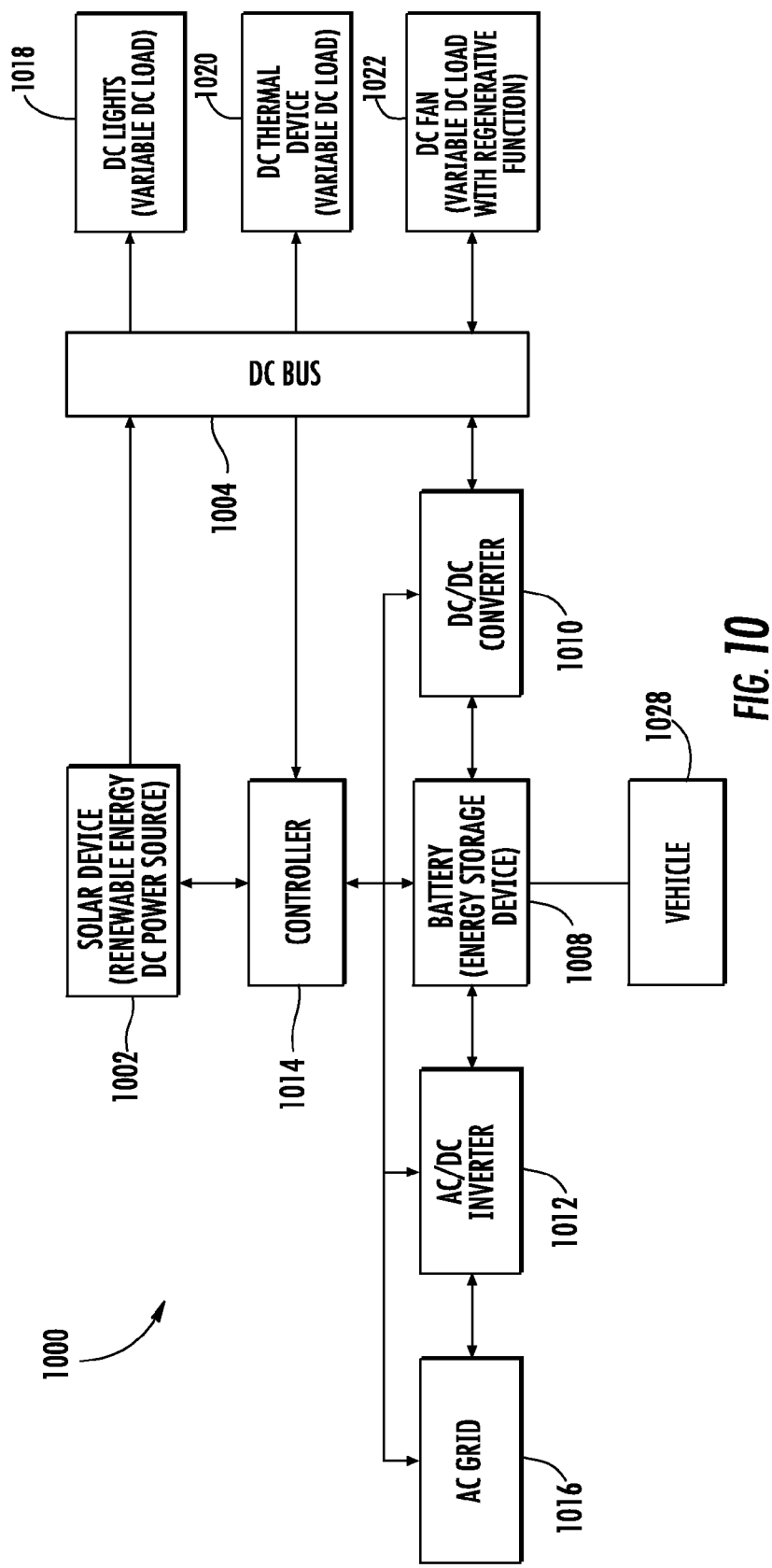
FIG. 10 is a block diagram of another embodiment of a DC power control system of the present invention.

FIG. 10 illustrates another embodiment of a DC power control system 1000 which may be substantially similar to DC power control system 800, except that system 1000 additionally includes a mobile device in the form of a motorized vehicle 1028 powered by battery 1008. DC power control system 1000 includes a renewable energy DC power source in the form of a solar device (e.g., a photovoltaic array) 1002 whose output is connected to a DC bus 1004. Solar device 1002 and DC bus 1004 are in communication with a source of DC power in the form of a DC/DC converter 1010 and an AC/DC inverter 1012, and with a processor in the form of a controller 1014. An energy storage device in the form of battery 1008 may provide DC power to DC bus 1004.

Both solar device 1002 and the DC power supply may provide DC electrical power to DC bus 1004. An AC grid 1016 may provide AC power to the DC power supply, which AC/DC inverter 1012 may convert to DC power. DC power consuming devices or variable DC loads in the form of DC lights 1018, DC thermal device 1020 (e.g., a freezer), and DC fan 1022 may draw DC power from DC bus 1004. DC fan 1022 may include a motor or generator that is capable of operating in a regenerative mode. Optionally, one of more energy storage elements (not shown) may be connected independently and/or directly to DC bus 804.

Motorized vehicle 1028 may be in the form of a golf cart or a fork lift, for example. Thus, the energy storage device may power the DC power consuming devices in conjunction with the solar device and the other source of DC power, and may also power the motorized vehicle. Accordingly, battery 1008 may substantially simultaneously perform both functions of providing emergency power for emergency loads when the solar device and the other source of DC power are inoperable, and being the exclusive source of power for a motorized vehicle.

It is to be understood that the present invention may encompass embodiments in which ceiling fans or other motor loads act in a regenerative braking mode as all or part of the energy storage to power the lights directly. That is, the regeneration may not necessarily charge other batteries in the system. In other words, if there are no batteries in the system, the fans slowing down could keep supplying power to the DC lights when the grid is lost. This method may help fill-in power when a cloud passes and suddenly solar power is lost. This may increase the life of the DC power supply because the DC power supply does not have as large of a power surge due to sudden clouds if the fan motors help supply even a small amount of energy storage.

Charging and Discharging Strategies for DC Microgrid Energy Storage

In some embodiments, the DC Microgrid has a significant amount of energy storage such that the energy storage capacity of the DC Microgrid substantially exceeds that which is required for only emergency backup purposes. In these embodiments, the energy storage capacity in excess of what is reserved for emergency backup is used to achieve other beneficial objectives, including demand response and peak load reduction. Additionally, because the energy storage capacity exceeds what is required for emergency backup purposes, the state of charge of the energy storage devices can be more flexibly managed to improve the performance and life of the energy storage devices.

Figure 11:
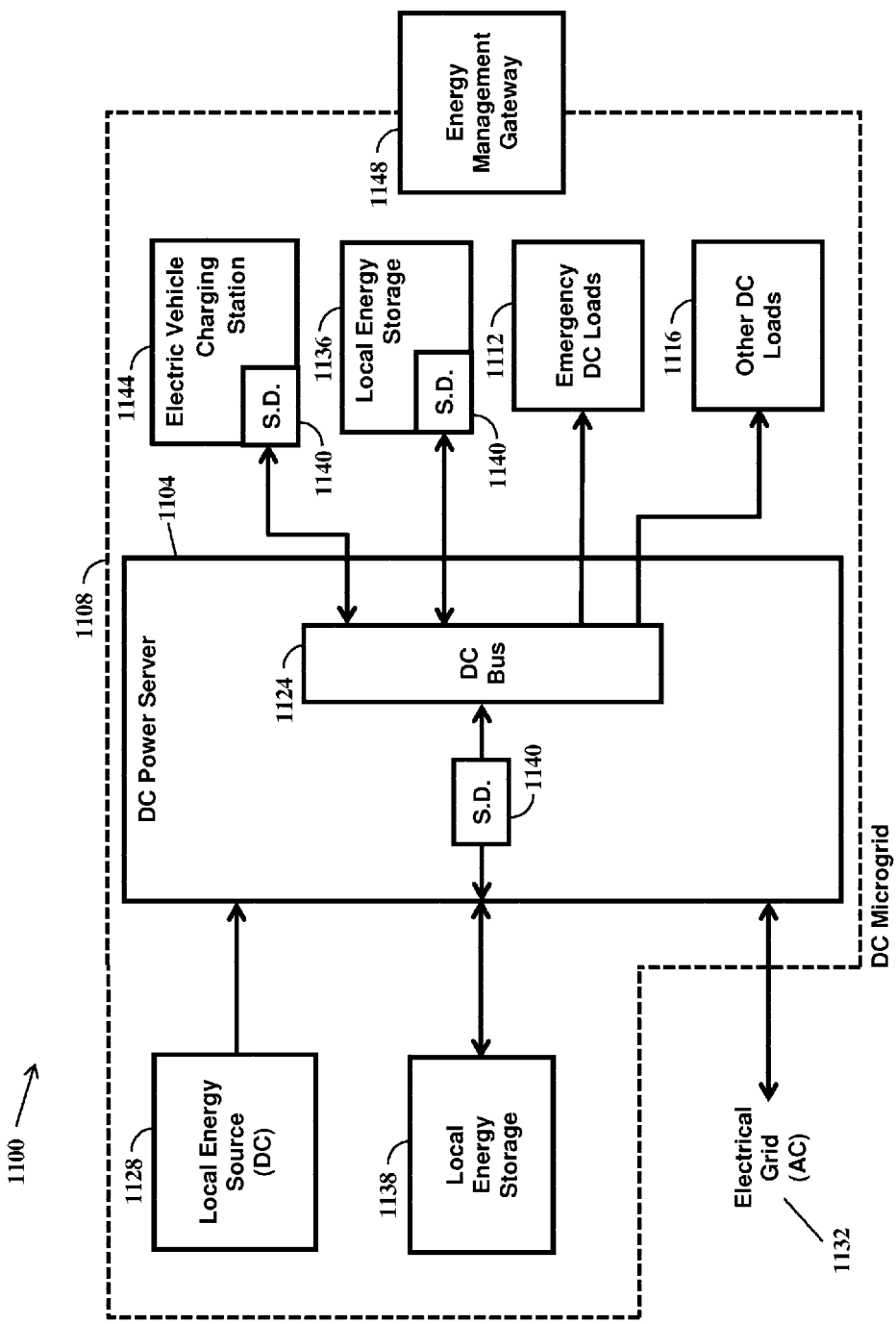
FIG. 11 is a block diagram of another embodiment of a DC building system of the present invention.

FIG. 11 shows a power distribution system 1100 having local energy storage that enables several beneficial strategies to be implemented. A DC power server 1104 is configured to support a DC microgrid 1108 for distributing DC power to DC loads of a building. In some embodiments, the DC loads include emergency DC loads 1112 and other DC loads 1116. In some embodiments, the emergency DC loads 1112 include an emergency lighting system. The emergency lighting system is implemented with solid state LED lighting or any other lighting technology that operates with DC power. The other DC loads 1116 include any other devices that are configured to operate with DC power but are deemed non-critical during a power outage. The power distribution system 1100 includes a DC bus 1124 established by the DC power server 1104 that distributes DC power to the DC loads of the building.

In some embodiments, a local energy source 1128 is connected to the DC power server 1104 to provide DC power to the DC bus 1124. In one embodiment, the local energy source 1128 is an on-site PV solar array that is configured to generate DC power to provide at least a portion of the power for the various loads in the system 1100. In other embodiments, the local energy source 1128 includes other types of renewable energy sources such as on-site wind or hydro systems configured to generate DC power. In further embodiments, the local energy source 1128 includes dispatchable energy sources such as fuel cells, stationary fossil-fuel (or bio-fuel) generators, or Combined Heat & Power (CHP) generators. The DC power server 1104 is also connected to an electrical grid 1132. During operation, the DC power server 1104 receives AC power from the electrical grid 1132, converts the AC power to a DC signal at a voltage level that is compatible with the system 1100, and provides the DC power to the DC bus 1124 for distribution to the loads in the system 1100. In some embodiments, the DC power server 1104 is also configured to export power to the electrical grid 1132 by converting DC power drawn from the DC bus 1124.

The power distribution system 1100 includes local energy storage 1136, 1338 which is configured to provide power to the DC bus 1124. In some embodiments, the local energy storage 1136, 1338 has reserved capacity that is dedicated to emergency backup purposes. Particularly, in the event of a power outage on the electrical grid 1132, energy from the local energy storage 1136, 1338 is used to provide power to the emergency DC loads 1112. In some embodiments, the reserved capacity for emergency backup is significantly less that a maximum capacity of the local energy storage 1136, 1338. The excess capacity is used to implement other beneficial strategies, such as demand response and peak load reduction.

In one embodiment, the local energy storage 1136, 1338 is a high-capacity on-site battery system, such as a lithium-ion battery system, a lead-acid battery system, or a redox flow battery system. In some embodiments, the local energy storage 1136 is connected to the DC bus 1124 via an integrated switching device 1140. Additionally, in some embodiments, local energy storage 1138 is connected directly to the DC power server 1104, which includes a switching device 1140 for connecting the local energy storage 1138 to the DC bus 1124. In some embodiments, an electric vehicle charging station (EVCS) 1144 is connected to the DC bus 1124 which can provide additionally energy storage when an electrical vehicle, such as a forklift or a golf cart, is connected to the EVCS 1144. The EVCS 1144 includes an integrated switching device 1140 for connecting batteries of the electrical vehicle to the DC bus 1124.

The switching devices 1140 are configured to control charging and discharging of energy storage devices 1136, 1338, and 1144 of the DC microgrid 1108. In one embodiment, the switching devices 1140 have a charge mode, a discharge mode, and a disconnected mode. In the charge mode, the switching devices 1140 operate to charge the corresponding energy storage device by drawing DC power from the DC bus 1124. In the discharge mode, the switching devices 1140 operate to discharge the corresponding energy storage device by drawing power from the energy storage device. In the disconnected mode, the switching devices 1140 operate to preserve a present state of charge of the corresponding energy storage device by disconnecting the corresponding energy storage device from the DC bus 1124.

The power distribution system 1100 further includes an energy management gateway 1148. The energy management gateway 1148 is a control system responsible for managing power drawn from the local energy source 1128, power drawn from or exported to the electrical grid 1132, and charging and discharging of the energy storage devices 1136, 1338, 1144. The energy management gateway 1148 is operably connected to a plurality of sensors configured to monitor power drawn from the local energy source 1128, drawn from or exported to the electrical grid 1132, and drawn from or provided to the energy storage devices 1136, 1338, 1144. The energy management gateway 1148 is also operably connected to a plurality of sensors configured to monitor power drawn by the DC loads from the DC bus 1124. The energy management gateway 1148 is also operably connected to a plurality of sensors configured to monitor states of charge of each of the energy storage devices 1136, 1338, 1144.

The energy management gateway 1148 is operably connected to the DC power server 1104 to control an amount of power drawn from or exported to the electrical grid 1132. The energy management gateway 1148 is also operably connected to the switching devices 1140 of each energy storage devices 1136, 1338, and 1144 to individually control charging and discharging of each energy storage device 1136, 1338, and 1144. The energy management gateway 1148 is configured to utilize the local energy source 1128, the local energy storage 1136, 1338, and the EVCS 1144 to enable peak load reduction, demand charge reduction, and other demand response participation.

The energy management gateway 1148 is configured to generate a schedule for charging, discharging, and disconnecting the energy storage devices 1136, 1338, 1144, and to operate the switching devices 1140 to charge, discharge, and disconnect the energy storage devices 1136, 1338, 1144 based on the generated schedule. Particularly, the energy management gateway 1148 is configured to generate an operational schedule for the switching devices 1140 that implements beneficial charging and discharging strategies for the energy storage devices 1136, 1338, and 1144. As used herein the term "schedule" refers to a plurality of future time periods at which the switching devices 1140 are to be operated to change between the charge mode, the discharge mode, and the disconnected mode. The charging and discharging strategy that may include equations, functions, algorithms, combinational logic, sequential logic, statistical models, or any other decision-making aid.

In some embodiments, the strategy takes into consideration variables such as a power demand level of the DC loads of the DC microgrid, a power demand level for the electrical grid 1132, a price of power from the electrical grid 1132, an amount of power being generated by the local energy source 1128, and states of charge of each of the energy storage devices 1136, 1338, 1144. In some embodiments, the strategy takes into consideration past values of some or all variables. In one embodiment, the energy management gateway 1148 maintains a record of past values for at least one variable. In some embodiments, the strategy takes into consideration predicted future values of some or all variables. In one embodiment, the energy management gateway 1148 is configured to predicted future values of at least one variable.

In some embodiments, the energy management gateway 1148 controls the charging and discharging of the energy storage devices 1136, 1338, 1144 according to a peak load reduction strategy. Particularly, the energy management gateway 1148 is configured to operate the switching devices 1140 to charge and discharge the energy storage devices 1136, 1338, 1144 based on a power demand level of at least one DC load of the DC microgrid 1108 and based on a state of charge of at least one of the energy storage devices 1136, 1338, 1144. In one embodiment, the energy management gateway 1148 communicates with sensors to identify a power demand level of one or more of the DC loads of the DC microgrid 1108 and to identify a state of charge of one or more of the energy storage devices 1136, 1338, 1144. Based on the identified power demand levels and the identified states of charge, the energy management gateway 1148 operates the switching devices 1140 to charge or discharge the energy storage devices 1136, 1338, 1144. In one embodiment, the energy storage devices 1136, 1338, and 1144 are discharged if the identified power demand level is greater than a first threshold while the identified states of charge are greater than a second threshold. In one embodiment, the energy management gateway 1148 is further configured to charge or discharge the energy storage devices 1136, 1338, 1144 based on a past power demand levels or predicted future power demand levels. In one embodiment, the energy management gateway 1148 is configured to maintain a record of past power demand levels. In one embodiment, the energy management gateway 1148 is configured to predict the future power demand levels.

In some embodiments, the energy management gateway 1148 controls the charging and discharging of the energy storage devices 1136, 1338, 1144 according to a demand response strategy. Particularly, the energy management gateway 1148 is configured to operate the switching devices 1140 to charge and discharge the energy storage devices 1136, 1338, 1144 based on a power demand level of the electrical grid 1132 and based on a state of charge of at least one of the energy storage devices 1136, 1338, 1144. In one embodiment, the energy management gateway 1148 communicates with sensors to identify a state of charge of one or more of the energy storage devices 1136, 1338, 1144 and receives a demand response signal indicating a power demand level of the electrical grid 1132. In one embodiment, the demand response signal is transmitted by an operator of the electrical grid 1132. Based on the indicated power demand level and the identified states of charge, the energy management gateway 1148 operates the switching devices 1140 to charge or discharge one or more of the energy storage devices 1136, 1338, 1144. In one embodiment, the energy storage devices 1136, 1338, and 1144 are discharged if the indicated power demand level is greater than a first threshold while the identified states of charge are greater than a second threshold. In one embodiment, the energy management gateway 1148 is further configured to charge or discharge the energy storage devices 1136, 1338, 1144 based on a past power demand levels or predicted future power demand levels. In one embodiment, the energy management gateway 1148 is configured to maintain a record of past power demand levels. In one embodiment, the energy management gateway 1148 is configured to predict the future power demand levels.

In some embodiments, the energy management gateway 1148 manages the amount of power drawn from or exported to the electrical grid 1132. Particularly, the energy management gateway 1148 is configured to control an amount of power being drawn from or exported to the electrical grid 1132 based on the power demand level of the DC loads of the DC microgrid 1108 and based on an amount of power being drawn from or provided to the energy storage devices 1136, 1338, 1144. In embodiments having the local energy source 1128, the energy management gateway 1148 is further configured to control the amount of power being drawn from or exported to the electrical grid 1132 based on an amount of power being generated by the local energy source 1128. In one embodiment, the energy management gateway 1148 communicates with sensors to identify a power demand level of all of the DC loads of the DC microgrid 1108, which includes any of the energy storage devices 1136, 1338, and 1144 that are being charged. The energy management gateway 1148 further communicates with sensors to identify an amount of power being provided to the DC bus 1124 by the local energy source 1128 and any of the energy storage devices 1136, 1338, and 1144 that are being discharged. Based on the identified power demand level and the identified amount of power being provided to the DC bus 1124, the energy management gateway 1148 operates the DC power server 1104 to adjust an amount of power being drawn from or exported to the electrical grid 1132. In one embodiment, the amount of power drawn from or exported to the electrical grid 1132 is equal to a difference between the identified power demand level and the identified amount of power being provided to the DC bus 1124.

In some embodiments, the energy management gateway 1148 maintains a minimum amount of stored energy in the energy storage devices 1136, 1338, 1144 for emergency backup purposes. Particularly, the energy management gateway 1148 is configured to maintain a minimum state of charge for one or more of the energy storage devices 1136, 1338, 1144 that enables the one or more of the energy storage devices 1136, 1338, 1144 to provide power at least one of the emergency DC loads 1112 for a predetermined time period. In one embodiment, the energy management gateway 1148 communicates with sensors to identify a state of charge of one or more of the energy storage devices 1136, 1338, 1144. Based on the identified states of charge, the energy management gateway 1148 determines an amount of stored energy in the one or more of the energy storage devices 1136, 1338, 1144. The energy management gateway 1148 operates the switching devices 1140 to disconnect the one or more of the energy storage devices 1136, 1338, 1144 in response to the determined amount of stored energy approaching a lower threshold. The lower threshold corresponds to the minimum amount of stored energy required for emergency backup. In one embodiment, the lower threshold corresponds to the minimum amount of stored energy to power all of the emergency loads 1112 for a predetermined amount of time. In one embodiment, the lower threshold corresponds to the minimum amount of stored energy to power an emergency lighting system of the emergency loads 1112 for a predetermined amount of time. In one embodiment, the predetermined amount of time corresponds to an amount of time required by law for an emergency lighting system. In one embodiment, the predetermined amount of time is 90 minutes.

In some embodiments, the energy management gateway 1148 discharges the energy storage devices 1136, 1338, 1144 to power the emergency loads 1112 in response to an outage on the electrical grid. Particularly, the energy management gateway 1148 is configured to operate the switching devices 1140 to discharge one or more of the energy storage devices 1136, 1338, 1144 to provide power to one or more of the emergency DC loads 1112 during a power outage on the electrical grid 1132. In one embodiment, in response to an outage on the electrical grid 1132, the energy management gateway communicates with sensors to identify a power demand level of the emergency DC loads 1112 and to identify an amount of power being generated by the local energy source 1128. The energy management gateway 1148 determines an amount of emergency power needed on the DC bus 1124 based on a difference between the identified power demand level and the identified amount of power being generated. The energy management gateway 1148 operates the switching devices 1140 to discharge one or more of the energy storage devices based on the determined about of emergency power needed. In one embodiment, the energy management gateway 1148 is further configured to turn off or disconnect the other DC loads 1116 in response to an outage on the electrical grid 1132.

In some embodiments, the energy management gateway 1148 charges and discharges each energy storage device in such a way as to maximize performance or life of the energy storage device. Most battery technologies have improved performance and minimal degradation when operated with a state of charge between particular upper and lower thresholds. For example, lead-acid batteries have minimal degradation when operated between about 45% and 75% of total capacity, whereas lithium-ion batteries have minimal degradation when operated between about 80% and 85% of total capacity. In one embodiment, when a charging and discharging strategy dictates that one of the energy storage devices 1136, 1338, 1144 should be discharged, the energy management gateway 1148 is configured to first discharge energy storage devices that have states of charge that are greater than the upper threshold for the energy storage devices. Similarly, when a charging and discharging strategy dictates that an energy storage devices should be charged, the energy management gateway 1148 is configured to first charge energy storage devices that have states of charge that are less than the lower threshold for the energy storage devices.

In one embodiment, the energy management gateway 1148 is configured to give preference to give preference to particular types of energy storage devices for demand response strategies. Particularly, energy storage devices other than the batteries in vehicles connected to the EVCS 1144 are primarily used for the charging and discharging strategies. Whereas, the batteries in the vehicles are primarily kept fully charged so that energy remains available for vehicle use and for emergency backup purposes.

In some embodiments, the energy management gateway 1148 charges and discharges the energy storage devices 1136, 1338, 1144 based on an amount of power being generated by the local energy source 1128. Particularly, in one embodiment, the energy management gateway 1148 communicates with sensors to identify an amount of power being generated by the local energy source 1128 and provided to the DC bus 1124. Based on the identified amount of generated power, the energy management gateway 1148 operates the switching devices 1140 to charge or discharge the energy storage devices 1136, 1338, 1144. In one embodiment, the energy management gateway 1148 is configured to charge one or more of the energy storage devices 1136, 1338, and 1144 in response to the identified amount of generated power being exceeding a first threshold. In one embodiment, the energy management gateway 1148 is configured to charge and discharge the energy storage devices 1136, 1338, and 1144 also based on a predicted future amount of generated power. In one embodiment, the energy management gateway 1148 is configured to predict the future amount of generated power. In one embodiment, wherein the local energy source 1128 is a PV array, the energy management gateway 1148 predicts the future amount of generated power based on a time of day or weather forecast information.

In some embodiments, the energy management gateway 1148 is configured to charge the energy storage devices 1136, 1338, 1144 during an outage of the electrical grid 1132 if sufficient power is being generated by the local energy source 1128 to otherwise provide power to DC loads of the building. Particularly, in response to an outage of the electrical grid 1132, the energy management gateway 1148 communicates with sensors to identify an amount of power being generated by the local energy source 1128 and provided to the DC bus 1124. If the identified amount of generated power is greater than a first threshold, the energy management gateway 1148 operates the switching devices 1140 to charge the energy storage devices 1136, 1338, 1144. In one embodiment the first threshold corresponds to an amount of power required to power just the emergency loads. In another embodiment, the first threshold corresponds to an amount of power required to power all of the DC loads of the DC microgrid 1108. In one embodiment, the energy management gateway 1148 further communicates with sensors to identify a power demand level of one or more of the DC loads of the DC microgrid 1108 and sets the first threshold equal to the identified power demand level. Operation in this way is particularly beneficial when an outage occurs on the electrical grid 1132 during a time of day at which a PV solar array is providing ample power to the DC microgrid 1108. The energy storage devices 1136, 1338, and 1144 are charged with excess solar power to prepare for nightfall and the corresponding loss of solar power.

In some embodiments, the energy management gateway 1148 performs state of health assessments of the energy storage devices 1136, 1338, and 1144. Particularly, in embodiments have many energy storage devices, state of health assessments can be performed on individual energy storage devices without affecting performance of the overall system. In some embodiments, the energy management gateway 1148 operates a subset of the switching devices 1140 to charge or discharge a subset of the energy storage devices 1136, 1338, and 1144. The energy management gateway 1148 communicates with sensors to measure a rate of charge or discharge of the subset of energy storage devices. Based on the measured rate of charge or discharge, the energy management gateway 1148 evaluates a state of health of some or all of the subset of energy storage devices. In some embodiments, the energy management gateway charges or discharges energy storage devices other than the subset of energy storage devices to counter-act the charging or discharging of the subset of energy storage devices. In this way, overall system performance is unaffected by the state of health assessments.

While preceding disclosure uses illustrative embodiments for explanatory purposes, the embodiments presented herein may be further modified within the spirit and scope of this disclosure. This application is therefore intended to cover any variations, uses, or adaptations of the disclosure using its general principles.

What is claimed is:

1. A power distribution system for a building comprising:
    a direct-current (DC) bus;
    at least one power consuming device connected to the DC bus and configured to receive DC power from the DC bus;
    a DC power supply connected to the DC bus, the DC power supply being configured to provide DC power to the DC bus by converting alternating-current (AC) power from an electrical grid;
    a plurality of energy storage devices connected to the DC bus via a plurality of switching devices, each energy storage device in the plurality of energy storage devices having minimal degradation when operated with a state of charge between an respective upper threshold and a respective lower threshold, each switching device in the plurality of switching devices being configured to charge a respective one energy storage device in the plurality of energy storage devices by drawing DC power from the DC bus and to provide power to the DC bus by discharging the respective energy storage device; and
    a control system operatively connected to the plurality of switching devices and configured to:
        generate a schedule for charging and discharging the plurality energy storage devices, the schedule including a plurality of time periods during which the plurality of energy storage devices are to be one of charged and discharged;
        in response to the generated schedule indicating that the plurality of energy storage devices are to be discharged, operating the plurality of switching devices to discharge energy storage devices in the plurality of energy storage devices that have states of charge greater than their respective upper thresholds before discharging energy storage devices in the plurality of energy storage devices that have states of charge less than their respective upper thresholds; and
        in response to the generated schedule indicating that the plurality of energy storage devices are to be charged, operating the plurality of switching devices to charge energy storage devices in the plurality of energy storage devices that have states of charge less than their respective lower thresholds before charging energy storage devices in the plurality of energy storage devices that have states of charge greater than their respective lower thresholds.

2. The power distribution system of claim 1, the control system being further configured to:
    generate the schedule for charging and discharging the plurality energy storage devices based on (i) a power demand level of the at least one power consuming device, and (ii) a state of charge of the plurality energy storage devices.

3. The power distribution system of claim 1, the control system being further configured to:
    generate the schedule for charging and discharging the plurality energy storage devices based on (i) a power demand level of the electrical grid, and (ii) a state of charge of the plurality energy storage devices.

4. The power distribution system of claim 1, wherein:
    the control system is operatively connected to the DC power supply; and
    the control system is further configured to:
        determine an amount of power to be provided from the electrical grid to the DC bus with based on (i) a power demand level of the at least one power consuming device, and (ii) one of an amount of power being provided by the plurality energy storage devices and an amount of power being drawn by the plurality energy storage devices; and
        operate the DC power supply to adjust an amount of power provided from the electrical grid to the DC bus based on the determined amount of power to be provided from the electrical grid to the DC bus.

5. The power distribution system of claim 1, wherein:
    the at least one power consuming device includes at least one emergency load, the at least one emergency load being a power consuming device that is to be operated under emergency conditions; and
    the control system is configured to:
        operate the plurality of switching device to maintain at least a minimum state of charge for the plurality energy storage devices, the minimum state of charge corresponding to a state of charge that enables the plurality energy storage devices to provide power to the at least one emergency load for at least a predetermined time period; and
        in response to an outage of the electrical grid, operate the plurality of switching device to discharge at least one of the plurality energy storage devices.

6. The power distribution system of claim 5, wherein the at least one emergency load includes an emergency lighting system.

7. The power distribution systems of claim 5, wherein the predetermined time period is 90 minutes.

8. The power distribution system of claim 1, the control system being further configured to:

operate the plurality switching devices to at least one of charge and discharge a first energy storage device of the plurality of energy storage devices;

measure at least one of a rate of charge and a rate of discharge of the first energy storage device of the plurality of energy storage devices; and evaluate a state of health of the first energy storage device of the plurality of energy storage devices based on to the measured at least one of rate of charge and rate of discharge.

9. The power distribution system of claim 1, the control system being further configured to:

generate the schedule for charging and discharging the plurality energy storage devices based on a predicted future power demand level of the at least one power consuming device.

10. The power distribution system of claim 1, the control system being further configured to:

generate the schedule for charging and discharging the plurality energy storage devices based on a predicted future power demand level of the electrical grid.

11. The power distribution system of claim 1, further comprising:

an energy source configured to generate DC power, the energy source being operatively connected to the DC bus to provide the generated DC power to the DC bus.

12. The power distribution system of claim 11, the control system being further configured to:

generate the schedule for charging and discharging the plurality energy storage devices based on an amount of DC power generated by the energy source.

13. The power distribution system of claim 11, wherein the energy source is a generator.

14. The power distribution system of claim 11, wherein the energy source is a photo-voltaic array.

15. The power distribution system of claim 14, the control system being further configured to:

generate the schedule for charging and discharging the plurality energy storage devices based on a predicted future amount of DC power generated by the photo-voltaic array.

16. The power distribution system of claim 15, the control system being further configured to:

predict the future amount of DC power generated by the photo-voltaic array based on weather forecast information.

17. The power distribution system of claim 14, the control system being further configured to:

in response to an outage of the electrical grid, operate the plurality switching devices to charge at least one of the plurality energy storage devices if an amount of DC power generated by the photo-voltaic array exceeds a first threshold.

* * * * *